US008180944B2

(12) United States Patent
Serebrin et al.

(10) Patent No.: US 8,180,944 B2
(45) Date of Patent: May 15, 2012

(54) GUEST INTERRUPT MANAGER THAT RECORDS INTERRUPTS FOR GUESTS AND DELIVERS INTERRUPTS TO EXECUTING GUESTS

(75) Inventors: Benjamin C. Serebrin, Sunnyvale, CA (US); John F Wiederhirn, San Jose, CA (US); Elizabeth M. Cooper, Los Gatos, CA (US); Mark D. Hummel, Franklin, MA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 234 days.

(21) Appl. No.: 12/611,607

(22) Filed: Nov. 3, 2009

(65) Prior Publication Data

US 2010/0191888 A1 Jul. 29, 2010

Related U.S. Application Data

(60) Provisional application No. 61/147,269, filed on Jan. 26, 2009.

(51) Int. Cl.
*G06F 13/24* (2006.01)
(52) U.S. Cl. ...................................................... 710/269
(58) Field of Classification Search .......... 710/260–269, 710/48–50
See application file for complete search history.

(56) References Cited

U.S. PATENT DOCUMENTS

| 5,222,215 A | 6/1993 | Chou et al. |
| 5,892,957 A | 4/1999 | Normoyle et al. |
| 6,622,193 B1 | 9/2003 | Avery |
| 7,000,051 B2 | 2/2006 | Armstrong et al. |
| 7,130,949 B2 * | 10/2006 | Belmar et al. ................. 710/260 |
| 7,209,994 B1 * | 4/2007 | Klaiber et al. ................. 710/264 |
| 7,222,203 B2 | 5/2007 | Madukkarumukumana et al. |
| 7,281,075 B2 | 10/2007 | Armstrong et al. |
| 7,380,041 B2 * | 5/2008 | Belmar et al. ................. 710/260 |
| 7,546,406 B2 | 6/2009 | Armstrong et al. |
| 7,552,236 B2 | 6/2009 | Greenfield et al. |
| 7,689,747 B2 | 3/2010 | Vega et al. |
| 7,707,341 B1 * | 4/2010 | Klaiber et al. ................. 710/244 |
| 7,873,770 B2 * | 1/2011 | Hummel et al. ............... 710/266 |
| 7,945,905 B2 * | 5/2011 | Kumar et al. .................. 717/143 |
| 8,055,827 B2 | 11/2011 | Serebrin et al. |
| 2004/0117532 A1 | 6/2004 | Bennett et al. |
| 2004/0205272 A1 | 10/2004 | Armstrong et al. |
| 2004/0215860 A1 | 10/2004 | Armstrong et al. |
| 2005/0125580 A1 | 6/2005 | Madukkarumukumana et al. |
| 2005/0228921 A1 * | 10/2005 | Sethi et al. .................... 710/268 |

(Continued)

OTHER PUBLICATIONS

U.S. Appl. No. 12/611,595, filed Nov. 3, 2009.

(Continued)

*Primary Examiner* — Raymond Phan
(74) *Attorney, Agent, or Firm* — Lawrence J. Merkel; Meyertons, Hood, Kivlin, Kowert & Goetzel, P.C.

(57) ABSTRACT

In an embodiment, a system comprises a memory system and a guest interrupt manager. The guest interrupt manager is configured to receive an interrupt message corresponding to an interrupt that is targeted at a guest executable on the system. The guest interrupt manager is configured to record the interrupt in a data structure in the memory system to ensure that the interrupt is delivered to the guest even if the guest is not active in the system at a time that the interrupt message is received.

17 Claims, 13 Drawing Sheets

U.S. PATENT DOCUMENTS

| | | |
|---|---|---|
| 2006/0075146 A1 | 4/2006 | Schoinas et al. |
| 2008/0015712 A1 | 1/2008 | Armstrong et al. |
| 2008/0114916 A1 | 5/2008 | Hummel |
| 2008/0162762 A1 | 7/2008 | Neiger et al. |
| 2010/0023666 A1 | 1/2010 | Mansell et al. |
| 2010/0223611 A1 | 9/2010 | Mahalingam et al. |

OTHER PUBLICATIONS

U.S. Appl. No. 12/611,622, filed Nov. 3, 2009.
U.S. Appl. No. 12/613,076, filed Nov. 5, 2009.
"Advanced Programmable Interrupt Controller (APIC)," Chapter 9, vol. 3, Sep. 2008, 68 pages.
Office Action from U.S. Appl. No. 12/611,595, mailed Dec. 17, 2010, 11 pages.
U.S. Appl. No. 12/961,186, filed Dec. 6, 2010, all pages.
U.S. Appl. No. 12/961,189, filed Dec. 6, 2010, all pages.
International Search Report for PCT/US2010/022111 mailed Jun. 9, 2010, 13 pages.
Office Action from U.S. Appl. No. 12/611,595, mailed May 27, 2011, Benjamin C. Serebrin, 7 pages.
Office Action from U.S. Appl. No. 12/611,622, mailed Dec. 16, 2011, Benjamin C. Serebrin, 9 pages.

* cited by examiner

Computer Accessible Storage Medium 200

VMM 18

Fig. 15

GUEST INTERRUPT MANAGER THAT RECORDS INTERRUPTS FOR GUESTS AND DELIVERS INTERRUPTS TO EXECUTING GUESTS

This application claims benefit of priority to U.S. Provisional Patent Application Ser. No. 61/147,269, filed Jan. 26, 2009. The Provisional Patent Application is incorporated herein by reference. To the extent that anything in the Provisional Patent Application contradicts material expressly included herein, the material herein controls.

BACKGROUND

1. Field of the Invention

This invention is related to processors and virtualization, and more particularly to delivering interrupts to virtual machine guests.

2. Description of the Related Art

Virtualization has been used in computer systems for a variety of different purposes. For example, virtualization can be used to execute privileged software in a "container" to prevent the privileged software from directly accessing and/or making changes to at least some of the physical machine state without first being permitted to do so by a virtual machine manager (VMM) that controls the virtual machine. Such a container can prevent "buggy" or malicious software from causing problems on the physical machine. Additionally, virtualization can be used to permit two or more privileged programs to execute on the same physical machine concurrently. The privileged programs can be prevented from interfering with each other since access to the physical machine is controlled. Privileged programs may include operating systems, and may also include other software which expects to have full control of the hardware on which the software is executing. In another example, virtualization can be used to execute a privileged program on hardware that differs from the hardware expected by the privileged program.

Generally, virtualization of a processor or computer system may include providing one or more privileged programs with access to a virtual machine (the container mentioned above) over which the privileged program has full control, but the control of the physical machine is retained by the VMM. The virtual machine may include a processor (or processors), memory, and various peripheral devices that the privileged program expects to find in the machine on which it is executing. The virtual machine elements may be implemented by hardware that the VMM allocates to the virtual machine, at least temporarily, and/or may be emulated in software. Each privileged program (and related software in some cases, such as the applications that execute on an operating system) may be referred to herein as a guest. Virtualization may be implemented in software (e.g. the VMM mentioned above) without any specific hardware virtualization support in the physical machine on which the VMM and its virtual machines execute. However, virtualization may be simplified and/or achieve higher performance if some hardware support is provided.

One issue that can arise with virtualization is the latency of interrupt delivery. As mentioned above, peripheral devices can be allocated for use by a virtual machine (to act as the virtual peripheral device in the virtual machine). Such peripheral devices can generate interrupts that are to be processed by the software in the virtual machine. In non-virtualized environments, the interrupt processing latency can be relatively short. In virtualized environments, the interrupts can generally be intercepted by the VMM, processed by the VMM, and delivered to the targeted virtual machine by the VMM using a software mechanism of some sort. However, the interrupt processing latency can be significantly greater (about 100 times longer, for example).

SUMMARY

In an embodiment, a system comprises a memory system and a guest interrupt manager. The guest interrupt manager is configured to receive an interrupt message corresponding to an interrupt that is targeted at a guest executable on the system. The guest interrupt manager is configured to record the interrupt in a data structure in the memory system to ensure that the interrupt is delivered to the guest even if the guest is not active in the system at a time that the interrupt message is received.

BRIEF DESCRIPTION OF THE DRAWINGS

The following detailed description makes reference to the accompanying drawings, which are now briefly described.

FIG. 15 is a block diagram of one embodiment of a computer accessible storage medium storing one embodiment of a VMM.

Figure 1:
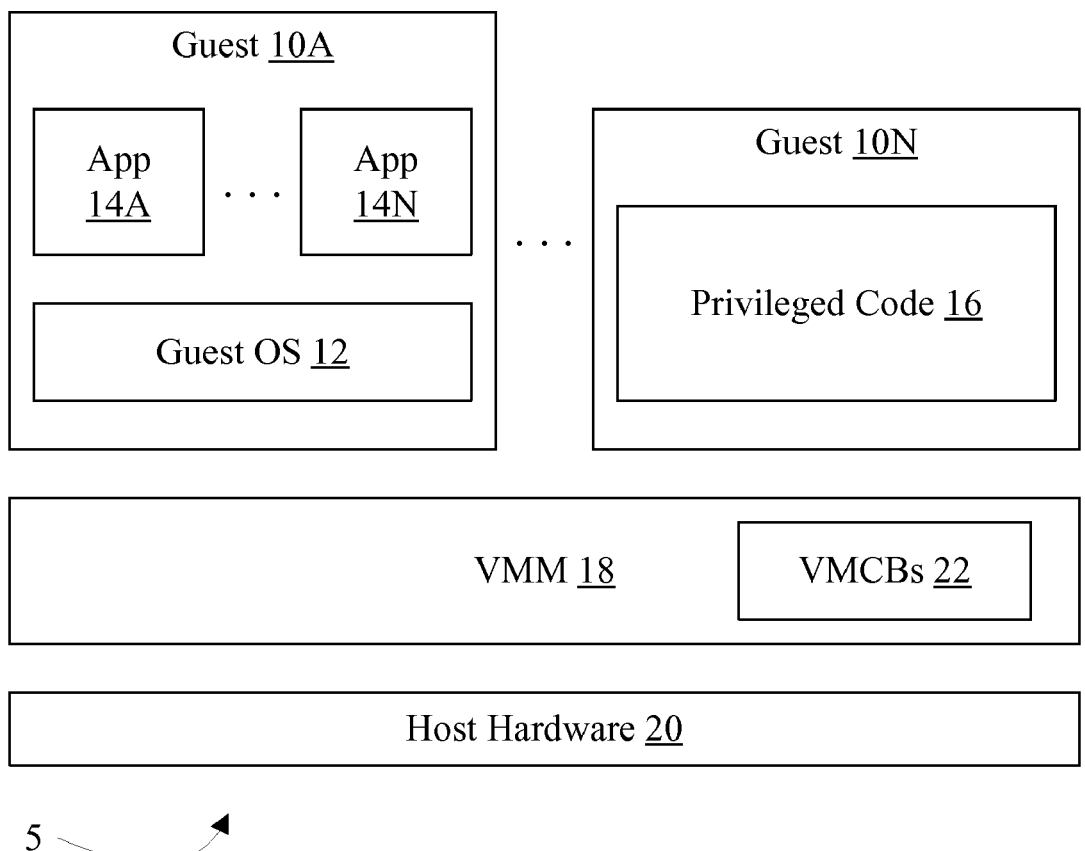
FIG. 1 is a block diagram of one embodiment of a computer system that implements virtualization.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits to implement the operation. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component.

DETAILED DESCRIPTION OF EMBODIMENTS

In an embodiment, a computer system may include at least one host interrupt controller and at least one guest interrupt controller. The host interrupt controller may manage interrupts that are to be serviced by the host (e.g. the virtual machine manager, or VMM, in a virtualized environment). Such interrupts may include, for example, interrupts from devices in the computer system that are not assigned to a guest executing on the system, system level interrupts that the VMM does not wish to expose to a guest, etc. The guest interrupt controller may manage interrupts that are to be serviced by a guest. Such interrupts may include, for example, interrupts issued by a device that is assigned to the guest to provide the functionality of the device for the guest's virtual machine.

The computer system may further include a guest interrupt manager, which may be responsible for delivering the interrupt to the correct guest interrupt controller for an active guest and for recording the interrupt for an inactive guest. With the guest interrupt manager, guest interrupts may be properly directed to the guest without software intervention during the interrupt delivery, in an embodiment. That is, the guest interrupt manager may ensure that the interrupt is correctly associated with a guest independent of whether or not the guest is currently active (scheduled on a host processor for execution) or inactive (not currently scheduled). An active guest may be running, or may be suspended due to an intercept being handled by the VMM on the host processor.

In an embodiment, the guest interrupt manager may maintain interrupt controller state for each guest (and for each processor in the guest, in one embodiment) in the main memory of the host. In response to receiving a guest interrupt, the guest interrupt manager may locate the in-memory guest interrupt controller state, and may update the state to record the interrupt. The guest interrupt manager may also be configured to transmit the interrupt to the guest interrupt controller of the host processor executing the guest, in one embodiment.

In one embodiment, the in-memory state may be arranged in a variety of fashions to facilitate location of the state to be updated by the guest interrupt manager, and/or to facilitate access to the state by the VMM to load into a guest interrupt controller or to write state back from a guest interrupt controller. In one embodiment, the updates to the in-memory state may be made atomically to ensure that no interrupt state is lost. For example, the interrupt controller may include a interrupt request register that includes a bit for each interrupt, which may be set to indicate that an interrupt is requested and may be reset when an interrupt is cleared. The computer system may support an atomic OR operation to OR an interrupt request into the in-memory state. The guest interrupt controller may similarly support an atomic OR operation to OR state loaded from memory to state in the interrupt controller.

Virtualization Overview

FIG. 1 illustrates a block diagram of one embodiment of a computer system 5 that implements virtualization. In the embodiment of FIG. 1, multiple guests 10A-10N are shown. Guest 10A includes a guest operating system (OS) 12 and one or more applications 14A-14N that run on the guest OS 12. Guest 10N includes privileged code 16. The guests 10A-10N are managed by a virtual machine manager (VMM) 18. The VMM 18 and the guests 10A-10N execute on host hardware 20, which may comprise the physical hardware included in the computer system 5. In one embodiment, the VMM 18 may maintain a set of virtual machine control blocks (VMCBs) 22. There may be one VMCB 22 for each guest 10A-10N. While the VMCBs 22 are shown as part of the VMM 18 for illustration in FIG. 1, the VMCBs 22 may be stored in memory and/or on non-volatile media such as disk drives in the host hardware 20.

The host hardware 20 generally includes all of the hardware included in the computer system 5. In various embodiments, the host hardware 20 may include one or more processors, memory, peripheral devices, and other circuitry used to couple the preceding components. Specifically, the host hardware 20 may include one or more host interrupt controllers, one or more guest interrupt controllers, and/or one or more guest interrupt managers. For example, personal computer (PC)-style systems may include a Northbridge coupling the processors, the memory, and a graphics device that uses the advanced graphic port (AGP) interface. Additionally, the Northbridge may couple to a peripheral bus such as the peripheral component interface (PCI) bus, to which various peripheral components may be directly or indirectly coupled. A Southbridge may also be included, coupled to the PCI bus, to provide legacy functionality and/or couple to legacy hardware. In various implementations, a guest interrupt manager may be implemented in the northbridge, the southbridge, or a device on one of the interfaces. Host and guest interrupt controllers may be implemented for each processor, or shared among a group of processors. In other embodiments, other circuitry may be used to link various hardware components. For example, HyperTransport™ (HT) links may be used to link nodes, each of which may include one or more processors, a host bridge, and a memory controller. Each node may also include a northbridge, which may include a guest interrupt manager and/or host and guest interrupt controllers. Alternatively, the host bridge may include a guest interrupt manager and/or host and guest interrupt controllers. The host bridge may be used to couple, via HT links, to peripheral devices in a daisy chain fashion. Any desired circuitry/host hardware structure may be used.

The VMM 18 may be configured to provide the virtualization for each of the guests 10A-10N, and may control the access of the guests 10A-10N to the host hardware 20. The VMM 18 may also be responsible for scheduling the guests 10A-10N for execution on the host hardware 20. The VMM 18 may be configured to use the hardware support provided in the host hardware 20 for virtualization. For example, the processors may provide hardware support for virtualization, including hardware to intercept events and exit the guest to the VMM 18 for handling. The guest interrupt manager and/or guest interrupt controllers may be hardware provided to support virtualization as well.

In some embodiments, the VMM 18 may be implemented as a "thin" standalone software program that executes on the host hardware 20 and provides the virtualization for the guests 10A-10N. Such a VMM implementation may sometimes be referred to as a "hypervisor". In other embodiments, the VMM 18 may be integrated into or execute on a host OS. In such embodiments, the VMM 18 may rely on the host OS, including any drivers in the host OS, platform system management mode (SMM) code provided by the system BIOS, etc. Thus, the host OS components (and various lower-level components such as the platform SMM code) execute directly on the host hardware 20 and are not virtualized by the VMM 18. The VMM 18 and the host OS (if included) may together be referred to as the host, in one embodiment. Generally, the host may include any code that is in direct control of the host hardware 20 during use. For example, the host may be the VMM 18, the VMM 18 in conjunction with the host OS, or the host OS alone (e.g. in a non-virtualized environment).

In various embodiments, the VMM 18 may support full virtualization, paravirtualization, or both. Furthermore, in some embodiments, the VMM 18 may concurrently execute guests that are paravirtualized and guests that are fully virtualized.

With full virtualization, the guest 10A-10N is not aware that virtualization is occurring. Each guest 10A-10N may have contiguous, zero based memory in its virtual machine, and the VMM 18 may use shadow page tables or nested page tables to control access to the host physical address space. The shadow page tables may remap from guest virtual addresses to host physical addresses (effectively the remapping the guest "physical address" assigned by memory management software in the guest 10A-10N to host physical address), while nested page tables may receive the guest physical address as an input and map to the host physical address. Using the shadow page tables or nested page tables for each guest 10A-10N, the VMM 18 may ensure that guests do not access other guests' physical memory in the host hardware 20.

With paravirtualization, guests 10A-10N may be at least partially VM-aware. Such guests 10A-10N may negotiate for memory pages with the VMM 18, and thus remapping guest physical addresses to host physical addresses may not be required. In one embodiment, in paravirtualization, guests 10A-10N may be permitted to directly interact with peripheral devices in the host hardware 20. At any given time, a peripheral device may be "owned" by a guest or guests 10A-10N. In one implementation, for example, a peripheral device may be mapped into a protection domain with one or more guests 10A-10N that currently own that peripheral device. Only guests that own a peripheral device may directly interact with it. There may also be a protection mechanism to prevent devices in a protection domain from reading/writing pages allocated to a guest in another protection domain.

As mentioned previously, the VMM 18 may maintain a VMCB 22 for each guest 10A-10N. The VMCB 22 may generally comprise a data structure stored in a storage area that is allocated by the VMM 18 for the corresponding guest 10A-10N. In one embodiment, the VMCB 22 may comprise a page of memory, although other embodiments may use larger or smaller memory areas and/or may use storage on other media such as non-volatile storage. In one embodiment, the VMCB 22 may include the guest's processor state, which may be loaded into a processor in the host hardware 20 when the guest is scheduled to execute and may be stored back to the VMCB 22 when the guest exits (either due to completing its scheduled time, or due to one or more intercepts that the processor detects for exiting the guest). In some embodiments, only a portion of the processor state is loaded via the instruction that transfers control to the guest corresponding to the VMCB 22 (the "Virtual Machine Run (VMRUN)" instruction), and other desired state may be loaded by the VMM 18 prior to executing the VMRUN instruction. Similarly, in such embodiments, only a portion of the processor state may be stored to the VMCB 22 by the processor on guest exit and the VMM 18 may be responsible for storing any additional state as needed. In other embodiments, the VMCB 22 may include a pointer to another memory area where the processor state is stored. Furthermore, in one embodiment, two or more exit mechanisms may be defined. In one embodiment, the amount of state stored and the location of state that is loaded may vary depending on which exit mechanism is selected.

In one embodiment, the VMM 18 may also have an area of memory allocated to store the processor state corresponding to the VMM 18. When the VMRUN is executed, the processor state corresponding to the VMM 18 may be saved in the area. When the guest exits to the VMM 18, the processor state from the area may be reloaded from the area to permit the VMM 18 to continue execution. In one implementation, for example, the processor may implement a register (e.g. a model specific register, or MSR) to store the address of the VMM 18 save area.

Additionally, the VMCB 22 may include an intercept configuration that identifies intercept events that are enabled for the guest, and the mechanism for exiting the guest if an enabled intercept event is detected. In one embodiment, the intercept configuration may include a set of intercept indications, one indication for each intercept event that the processor supports. The intercept indication may indicate whether or not the processor is to intercept the corresponding event (or, viewed in another way, whether or not the intercept is enabled). As used herein, an event is "intercepted" in a guest if, should the event occur in the guest, the processor exits the guest for processing of the event. In one embodiment, the intercept configuration may include a second set of indications which indicate which of two exit mechanisms are used. Other embodiments may define more than two exit mechanisms. In another embodiment, the intercept configuration may comprise one set of intercept indications, one per intercept event, that indicate whether or not a first exit mechanism should be used for the event; and a second set of intercept indications, one per intercept event, that indicate whether or not a second exit mechanism should be used for the event.

Generally, the exit mechanism may define the operations performed by the processor to exit guest execution (generally in a restartable fashion) and to begin executing other code. In one embodiment, one exit mechanism may include saving a small amount of processor state and loading state for a Minivisor. The Minivisor may execute in the guest physical address space, and may perform relatively simple intercept processing. Another exit mechanism may exit to the VMM, saving a larger amount of processor state and loading the VMM's processor state. Thus, intercept events may be processed by different instruction code depending on the event. Additionally, relatively simple intercept processing may be processed through a "lighter weight" exit mechanism which may take less time to perform, which may improve performance in some embodiments. More complicated processing may be performed in the VMM, after a "heavier weight" mechanism is used to exit. Thus, in this embodiment, the VMM 18 may configure the processor to intercept those events that the VMM 18 does not wish the guest 10A-10N to handle internally, and may also configure the processor for which exit mechanism to use. Events may include instructions (that is, intercept an instruction instead of executing it), interrupts, exceptions, and/or any other desired events that may occur during guest execution.

In one embodiment, the VMCB 22 may further include other control bits that may cause the processor to perform certain actions upon loading the VMCB 22. For example, the control bits may include indications to flush the TLB in the processor. Other control bits may specify the execution environment for the guest (e.g. interrupt handling modes, an address space identifier for the guest, etc.). Still other control bits may be used to communicate an exit code describing why the guest exited, etc.

Generally, a "guest" may comprise any one or more software programs that are to be virtualized for execution in the computer system 5. A guest may include at least some code that executes in privileged mode, and thus expects to have full control over the computer system on which it is executing. As mentioned previously, guest 10A is an example in which the guest includes a guest OS 12. The guest OS 12 may be any OS, such as any of the Windows OSs available from Microsoft Corp., (Redmond, Wash.), any UNIX-type operating system such as Linux, AIX from IBM Corporation (Armonk, N.Y.), Solaris from Sun Microsystems, Inc. (Santa Clara, Calif.), HP-UX from Hewlett-Packard Company (Palo Alto, Calif.), etc. The guest 10N is an example of a guest that comprises non-OS privileged code 16.

It is noted that the letter "N" when used herein in reference numerals such as 10N is meant to generically indicate any number of elements bearing that reference numeral (e.g. any number of guests 10A-10N, including one guest). Additionally, different reference numerals that use the letter "N" (e.g. 10N and 14N) are not intended to indicate like numbers of the different elements are provided (e.g. the number of guests 10A-10N may differ from the number of applications 14A-14N) unless otherwise noted.

Host Hardware

Figure 2:
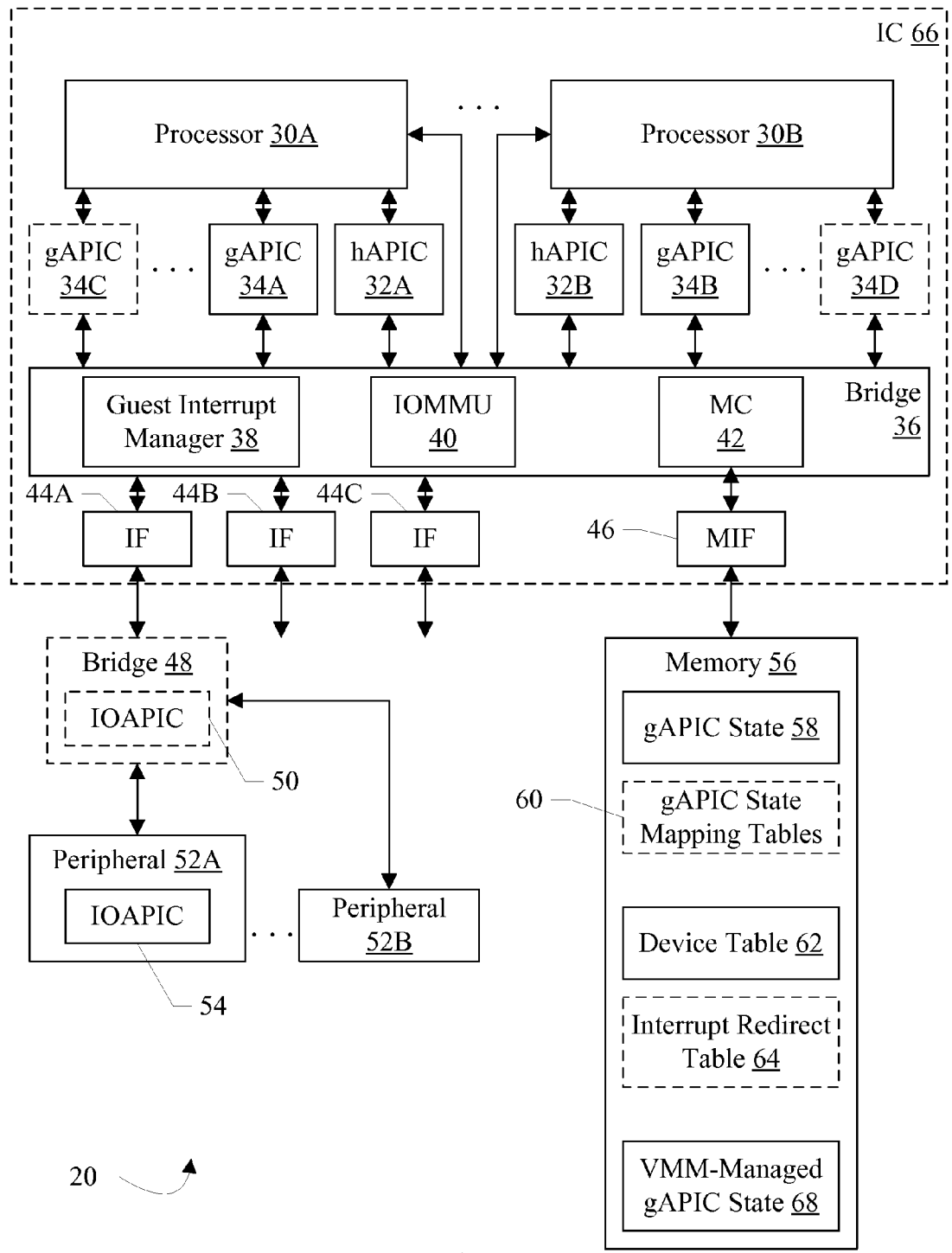
FIG. 2 is a block diagram of one embodiment of host hardware illustrated in FIG. 1.

Turning now to FIG. 2, a block diagram illustrating one embodiment of the host hardware 20 is shown. In the illustrated embodiment, the host hardware 20 includes a plurality of processors 30A-30B, respective host Advanced Programmable Interrupt Controllers (hAPICs) 32A-32B, respective guest APICs (gAPICs) 34A-34B, and optional additional gAPICs 34C-34D, a bridge 36 (that includes a guest interrupt manager 38, an input/output (I/O) memory management unit (IOMMU) 40, and a memory controller 42), a plurality of interface circuits (IF) 44A-44C, a memory interface circuit (MIF) 46, an optional bridge 48 that may include an IOAPIC 50, peripherals 52A-52B (some of which may include an IOAPIC such as the IOAPIC 54), and a memory 56. The processors 30A-30B are coupled to the bridge 36 and to the respective hAPICs 32A-32B and gAPICs 34A-34D as illustrated in FIG. 2. The hAPICs 32A-32B and gAPICs 34A-34D are coupled to the bridge 36, which is coupled to the interface circuits 44A-44C and the memory interface circuit 46. The memory interface circuit 46 is coupled to the memory 56, and the interface circuit 44A is coupled to the bridge 48, which is coupled to the peripherals 52A-52B.

In the illustrated embodiment, each processor 30A-30B has an associated hAPIC 32A-32B and at least one associated gAPIC 34A-34D. In this embodiment, interrupts may be communicated in the host hardware 20 according to the APIC specification described by Intel Corporation (Santa Clara, Calif.). In that specification, each processor has an associated local APIC that receives interrupts (both from the processor itself, other processors, internal APIC interrupt sources, and IOAPICs associated with peripherals. The local APIC prioritizes the pending interrupts, and transmits an interrupt to the processor if it is higher priority than another interrupt that is in progress on the processor and/or if it is higher priority than the processor's current task.

In the embodiment of FIG. 2, the hAPIC 32A-32B may be the local APIC for the processor's host interrupts (that is, interrupts to be processed by the host) and the gAPIC 36A-36D may be the local APIC for the processor's guest interrupts (that is, interrupts to be processed by a guest that is active on the respective processor 30A-30B). A guest may be active on a processor if the guest is currently executing on that processor (e.g. a VMRUN instruction has been executed on the processor for the guest, and a guest exit has not occurred), or if the guest has exited and the VMM 18 is executing, but the guest is expected to be executed again on the processor.

When the VMM 18 schedules a guest on a processor 30A-30B, the VMM 18 may load the gAPIC 34A-34D of that processor 30A-30B with the gAPIC state corresponding to the guest. Specifically, a given guest may have multiple virtual CPUs (vCPUs). The VMM 18 may schedule a vCPU of a guest to execute on the processor 30A-30B, and may load the gAPIC 34A-34D with the interrupt state for that vCPU within the guest's virtual machine. Additionally, any interrupts that are targeted at the guest (and vCPU) that are signalled while the guest is active may be captured by the gAPIC 34A-34D. The gAPIC 34A-34D may interrupt the guest according to the APIC specification, as mentioned above.

The hAPIC 32A-34B and gAPIC(s) 34A-34D for a given processor 30A-30B may have any interface to the processor. For example, any interface used between local APICs and their respective processors may be used. Each APIC may be configured to independently signal the processor that an interrupt is being delivered for service. If the processor is executing a guest and a guest interrupt is signalled, the processor may be configured to interrupt the guest code and begin execution of the correct interrupt handler within the guest's virtual machine. Thus, the guest interrupt may be delivered with a latency similar to the delivery of an interrupt in the host, in an embodiment. If the processor is executing a guest and the hAPIC signals an interrupt, the processor may be configured to exit the guest to the VMM 18 to process the host interrupt. If the processor is not executing the guest, an interrupt signalled by the gAPIC may be masked by the processor until the guest is executed again. If the processor is not executing the guest and the hAPIC signals in interrupt, the processor may be configured to interrupt the host execution and branch to the host interrupt handler.

In one embodiment, more than one gAPIC 34A-34D may be included per processor 30A-30B. Each gAPIC 34A-34D may store the APIC state corresponding to a different guest/vCPU. In such an embodiment, each gAPIC 34A-34D may be configured to identify which guest it corresponds to when signalling a guest interrupt to the processor (or the processor 30A-30B may have internal registers that identify which guest is currently assigned to each gAPIC 34A-34D). The processor may mask the guest interrupt if a different guest is currently in execution, similar to masking the guest interrupt when the VMM 18 is not executing. Alternatively, each gAPIC 34A-34D may include an active indication that may be set to active by the VMM 18 when the corresponding guest is scheduled, and the gAPIC 34A-34D may be configured to only signal its guest interrupt when the corresponding guest is active. Including more than one gAPIC 34A-34D per processor 30A-30B may reduce the amount of gAPIC state movement when multiple guests are scheduled to execute on the processor over time. For example, if there are N gAPICs 34A-34D per processor 30A-30B (where N is an integer greater than 0), up to N different guests may be scheduled for execution before gAPIC state may need to be saved for any of the guests. In some embodiments that implement more than one gAPIC 34A-34D per processor 30A-30B, the gAPICs 34A-34D may include additional state to ensure the interrupt messages are properly accepted and/or logged. For example, the gAPICs 34A-34D may include a "currently running" indication that identifies whether or not the corresponding virtual machine is currently in execution on the corresponding processor 30A-30B (as opposed to being in suspension for VMM execution or while another virtual machine is executing). If the currently running indication indicates that the virtual machine is in execution, the gAPIC may accept the interrupt message. If the currently running indication indicates that the virtual machine is not in execution, the gAPIC may signal interrupt not accepted. Alternatively, the gAPIC may include an additional indication indicating whether or not the gAPIC is to signal interrupt not accepted. In such an embodiment, the gAPIC may signal interrupt not accepted if the currently running indication indicates not currently running and the not-accepted indication indicates that the gAPIC is to signal interrupt not accepted. Such functionality may be used to detect that an interrupt is received for a guest that is not running, which may be used to schedule the guest that is targeted by the interrupt.

The gAPICs 34A-34D may include at least a portion of the hardware that is included in the hAPICs 32A-32B, and may include all of the hardware (e.g. may be duplicates of the hAPICs 32A-32B). The gAPICs 34A-34D may be programmable with a guest identifier (ID), in addition to APIC state, to identify which guest the gAPIC 34A-34D is assigned to. If the guest includes multiple vCPUs, the physical APIC ID and logical APIC ID may identify the vCPU within the guest. In one embodiment, the guest ID may be the same as a domain ID supported by the IOMMU 40 for peripheral devices. Alternatively, the guest ID may be a separately managed resource. In either case, the VMM 18 may assign guest IDs to guests and may ensure that the gAPICs 34A-34D are programmed appropriately for each guest. The vCPU and/or gAPIC and/or the pair may be referred to herein more succinctly as the destination of an interrupt within the guest. The destination may ultimately be the vCPU that is to service the interrupt, but the corresponding gAPIC may also be viewed as the destination since it is it its associated with the corresponding processor and records the interrupt.

The gAPICs 34A-34D and hAPICs 32A-32B are coupled to the bridge 36 to receive interrupts. Any interface may be used to transport interrupts to the gAPICs 34A-34D and hAPICs 32A-32B. For example, any interface implemented for APIC interrupt transport may be used. In one embodiment, the same communication mechanism used to communicate other operations to/from the processors 30A-30B (such as memory read/write operations initiated by the processors 30A-30B, probes for cache coherency maintenance, etc.) may be used to transport interrupt messages. Viewed in another way, the coupling of the gAPICs 34A-34D and the hAPICs 32A-32B may be shared with the coupling of the processors 30A-30B to the bridge 36. Alternatively, the processors 30A-30B may have a separate path to the bridge 36, such as if the gAPICs 34A-34D and the hAPICs 32A-32D use the APIC "3 wire interface." An interrupt message may be any communication on any interface that identifies the interrupt being transmitted and the destination of the interrupt. For example, interrupts may have associated interrupt vectors, and the interrupt vector may be part of the interrupt message. The interrupt message may also include the guest ID and destination ID (e.g. logical or physical APIC ID).

The hAPICs 32A-32B may be similar to local APICs. For example, the hAPICs 32A-32B may not include the additional hardware for guest identification, since the hAPICs are used for host interrupts. Alternatively, the hAPICs 32A-32B may include the additional hardware but the additional hardware may be programmed to indicate that the hAPICs 32A-32B are for host interrupts. The interrupt messages transmitted by the bridge 36 to the hAPICs 32A-32B and gAPICs 34A-34D may identify guest interrupts as opposed host interrupts, and may include the guest ID for guest interrupts (or may use a reserved guest ID, such as zero or all binary ones, to indicate a host interrupt). The hAPICs 32A-32B may be configured to accept interrupts that are identified as host interrupts (if the physical APIC ID or the logical APIC ID of the host interrupt matches the corresponding hAPIC ID), and the gAPICs 34A-34D may be configured to accept the guest interrupts for their respective guests (if the guest ID matches, and if the physical APIC ID or the logical APIC ID of the guest interrupt match the corresponding gAPIC ID).

While the gAPICs 34A-34D may manage interrupts for active guests, some guests may be inactive (and/or may have inactive vCPUs that may be targeted by a guest interrupts). In one embodiment, the guest interrupt manager 38 may be configured to maintain guest interrupt state for inactive guests and to ensure that the gAPICs for the active guests receive their interrupts.

Particularly, in one embodiment, the guest interrupt manager 38 may employ a distributed interrupt delivery scheme in which the guest interrupt manager 38 may be configured to record each guest interrupt received in the bridge 36, and may also be configured to transmit the guest interrupt to each gAPIC 34A-34D. If a gAPIC 34A-34D accepts the interrupt, then the guest targeted by the guest interrupt is active. If no gAPIC 34A-34D accepts the interrupt, the guest targeted by the guest interrupt is inactive.

In the illustrated embodiment, the guest interrupt manager 38 may be configured to maintain the gAPIC state for the guests that are defined in the system 5 in a gAPIC state data structure 58 in the memory 56. The gAPIC state data structure 58 may include a gAPIC state entry for each gAPIC defined in the system (e.g. one entry for each vCPU in each guest 10A-10N in the system). A gAPIC may be defined in the system if it is associated with either an active guest or an inactive guest in the system. Accordingly, in response to receiving a guest interrupt, the guest interrupt manager 38 may be configured to update the gAPIC state in the gAPIC state data structure 58 for the guest/vCPU targeted by the interrupt. The guest interrupt manager 38 may be configured to update the gAPIC state independent of whether or not the guest is active, in one embodiment. For multicast and broadcast interrupts that have more than one target, the guest interrupt manager 38 may be configured to update the gAPIC state in the gAPIC state data structure 58 for each interrupt destination. Alternatively, the guest interrupt manager 38 may be configured to rely on the VMM 18 for these multiple destination interrupts. The guest interrupt manager 38 may be configured to log the interrupt in a memory location accessible to the VMM 18 in such embodiments, and may be configured to signal the VMM 18 to process the message.

In some embodiments, the guest interrupt manager 38 may be configured to locate the gAPIC state entry in the gAPIC state data structure 58 directly in response to the guest ID and/or other information in the guest interrupt message. In other embodiments, to provide flexibility in the gAPIC state data structure 58 and/or to conserve memory space, the guest interrupt manager 38 may be configured to use gAPIC state mapping tables 60 to locate the gAPIC state entry in the gAPIC state data structure 58. Various embodiments of the gAPIC state data structure 58 and the mapping tables 60 (for some embodiments) are illustrated in FIGS. 10-13 and discussed in more detail below. Accordingly, in response to a guest interrupt, the guest interrupt manager 38 may be configured to locate the gAPIC state entry using the gAPIC state mapping tables 60 and to update the gAPIC state entry to record the interrupt.

In one embodiment, the gAPIC state data structure 58 may store a subset of the gAPIC state. The subset may be the gAPIC state that is tracked by the hardware 20 (e.g. the guest interrupt manager 38, in conjunction with the IOMMU 40). More particularly, the subset may be the portion of the gAPIC state that may change while the corresponding guest is inactive. For example, in one embodiment, a peripheral 52A-52B may signal an interrupt while the corresponding guest is inactive, which may cause a corresponding interrupt request to be captured the gAPIC. The interrupt requests may be tracked in the gAPIC state data structure 58. Other gAPIC state may track which interrupts are in-service by the processor, the task priority of the processor, etc. These values may only change when the guest is active. In an embodiment, gAPIC state that may not change when the guest is inactive may be tracked by the VMM 18, using one or more other data structures illustrated as VMM-managed gAPIC state data structure 68 in FIG. 2. The VMM 18 may transfer state between the VMM-managed state 68 and the gAPICs 34A-34D as part of activating and deactivating guests in the system.

While the gAPIC state mapping tables 60 and the gAPIC state data structure 58 are shown as stored in memory 56 in the illustrated embodiment, portions of one or both may be cached by the guest interrupt manager 38 and/or a cache accessible to the bridge 36. In addition or alternatively, a dedicated memory for one or more gAPIC state entries may be implemented in the bridge 36. The dedicated memory may store a set of "fast" gAPIC states that may rapidly be switched into and out of the gAPICs 34A-34D. Other gAPIC states may be more slowly accessible in the memory 56. In some embodiments, the fast gAPIC state switches may be handled by the guest interrupt manager 38 while the slower gAPIC state switches may be handled by the VMM 18.

In the APIC interrupt mechanism, each processor (through its local APIC) may have a physical APIC ID and a logical APIC ID. The physical APIC ID is stored in the APIC ID register. A physical APIC ID is matched on a one-to-one basis with the physical APIC ID indicated by a physical delivery mode interrupt. The logical APIC ID is stored as the logical destination register in the local APIC. The logical APIC ID has a cluster ID and a local APIC ID, where the local APIC ID is a one-hot vector. Logical delivery mode interrupts may include any set bits in the one-hot vector to deliver interrupts to one or more local APICs in the cluster. Accordingly, matching a logical APIC ID may include comparing the cluster ID and detecting a set bit in the local APIC ID vector at the same position as the set bit of the one-hot bit vector in the local APIC. Viewed in another way, the local APIC ID vector in a logical delivery mode interrupt may be logically ANDed with the local APIC ID vector of the local APIC, and if the result is non-zero and the cluster ID matches, then the local APIC is a target of the logical interrupt. The logical APIC ID may be more succinctly referred to herein as the logical ID, and similarly the physical APIC ID may be more succinctly referred to herein as the physical ID. A given ID (logical or physical) associated with an interrupt may be referred to as the destination ID of the interrupt. A corresponding delivery mode for the interrupt may identify the destination ID of the interrupt.

The gAPICs 34A-34D may support both physical and logical delivery modes as well. In addition to matching the APIC ID in an interrupt message according to the mode as highlighted above, the gAPICs 34A-34D may match the guest ID in the interrupt message to the guest ID in the gAPIC.

The IOMMU 40 may be configured to perform virtual to physical address mapping for I/O-initiated memory operations (e.g. memory read/write operations sourced from the peripherals 52A-52B or by DMA controllers on behalf of the peripherals 52A-52B). As part of the translation operation, the IOMMU 40 may be configured to access a device table 62 and optionally an interrupt redirect table 64. The device table 62 may include entries for each peripheral 52A-52B (and may include multiple entries for a peripheral that includes more than one identifier on the peripheral interface to which the peripherals are coupled). The device table 62 may include a page table pointer to I/O page tables for translating the memory addresses of the memory read/write operations (not shown) and may include a pointer to the interrupt redirect table 64. In some embodiments, the device table 62 may store a guest ID for peripherals that are assigned to a guest. In one embodiment, the guest ID may be the same as a domain ID used for device access protection in the IOMMU 40. Alternatively, the guest ID may be separately assigned. In an embodiment, the device table 62 may also store a pointer to the gAPIC state mapping tables 60 (if used), or a pointer to the gAPIC state data structure 58. In another embodiment, the guest ID and/or the pointer to the table 60/data structure 58 may be stored in the interrupt redirect table 64. The interrupt redirect table 64 may be used to redirect an interrupt from its original destination and/or interrupt vector to a new destination and/or interrupt vector. For simplicity in the remainder of this disclosure, an embodiment in which the guest ID is the domain ID from the device table 62 and the pointer to the mapping tables 60 and/or gAPIC state data structure 58 is stored in the device table 62 will be used. However, the embodiments in the remainder of this disclosure may be generally modified as discussed above.

In other embodiments, the guest interrupt manager 38 may not be provided. Such a configuration may be possible, for example, if the VMM 18 updates the device table 62 and/or the interrupt redirect table 64 when guests are migrated from one processor 30A-30B to another, and if a processor 30A-30B is dedicated to receive interrupts on behalf of inactive guests (to update the gAPIC state data structure 58 in the memory 56 and/or to service the interrupt, as desired).

The memory controller 42 may be coupled to receive memory operations issued by the processors 30A-30B (e.g. instruction fetches, load/store data accesses, processor page table accesses for translation, etc.), memory operations from the guest interrupt manager 38 (e.g. to read/update the gAPIC state data structure 58 and/or the gAPIC state mapping tables 60), the IOMMU 40 (e.g. to access I/O page tables, the device table 62, and the interrupt redirect table 64), and memory operations received from the interface circuits 44A-44C (in some embodiments). The memory controller 42 may be configured to order the memory operations, and to communicate with the memory 56 to perform the memory operations. The memory interface circuit 46 may perform the physical level accesses to the memory 56.

The memory 56 may comprise any type of memory. For example, the memory 56 may comprise dynamic random access memory (DRAM) such as synchronous DRAM (SDRAM), double data rate (DDR, DDR2, DDR3, etc.)

SDRAM, RAMBUS DRAM, static RAM, etc. The memory 56 may include one or more memory modules comprising multiple memory chips, such as single inline memory modules (SIMMs), dual inline memory modules (DIMMs), etc.

In addition to including the guest interrupt manager 38, the IOMMU 40, and the memory controller 42 in this embodiment, the bridge 36 may also include other communication functionality to communicate between the processors 30A-30B, the hAPICs 32A-32B, the gAPICs 34A-34D, and devices coupled to the interface circuits 44A-44D. For example, in the illustrated embodiment, another bridge 48 may be coupled to the interface circuit 44A, and may be configured to bridge communications between the protocol used by the interface circuit 44A and the protocol used by the peripherals 52A-52B. In one embodiment, the interface circuits 44A-44C may implement the HT interface mentioned above, for example, and the bridge 48 may bridge from HT to another interface such as the PCI Express (PCIe) interface. The peripherals 52A-52B may be PCIe devices in such an embodiment. The bridge 48 may also be configured to bridge to other interfaces, or another bridge may be coupled to the bridge 48 to bridge to other interfaces. Any peripheral interface or interfaces may be used. Additionally, the peripherals 52A-52B may comprise HT peripherals configured to couple directly to the HT interface. Such peripherals may not require the bridge 48.

In one embodiment, the bridge 48 and/or one or more of the peripherals 52A-52B may include IOAPICs (50 and 54 in FIG. 2). The IOAPICs may be responsible for receiving interrupt requests from the peripherals, and forming interrupt messages to transmit the interrupt requests to the hAPICs 32A-32B and the guest interrupt manager 38 (for transmission to the gAPICs 34A-34D and/or recording in the gAPIC state data structure 58 in memory).

As mentioned above, in one embodiment, the interface circuits 44A-44C may be configured to communicate on the HT interface. The interface circuits 44A-44C may be configured to communicate with peripheral devices/bridges using HT. Additionally, in some embodiments, the interface circuits 44A-44C may be configured to coupled to other nodes with processors, hAPICs, gAPICs, etc. In such embodiments, the bridge 36 may include coherence management circuitry in addition to the previously described circuitry.

The processors 30A-30B may implement any instruction set architecture, and may be configured to execute instructions defined in the instruction set architecture. The processors 30A-30B may include any microarchitecture, such as superpipelined, superscalar, and/or combinations thereof; in-order or out-of-order execution; speculative execution; etc. The processors 30A-30B may or may not implement microcoding techniques, as desired.

The peripherals 52A-52B may comprise any type of peripheral device. The peripherals 52A-52B may include storage devices such as magnetic, solid state, or optical disk drives, non-volatile memory devices such as Flash memory, etc. The peripherals 52A-52B may include I/O devices such as user I/O devices (keyboard, mouse, display, voice input, etc.), networking devices, external interface devices such as Universal Serial Bus (USB) or Firewire, etc.

In the illustrated embodiment, the processors 30A-30B, the bridge 36, the hAPICs 32A-32B, the gAPICs 34A-34D, the interface circuits 44A-44C, and the memory interface circuit 46 may be integrated onto a single semiconductor substrate as an integrated circuit 66. Other embodiments may implement different amounts of integration and discrete circuitry, as desired. It is noted that, while various numbers of components such as processors, hAPICs, gAPICs, interface circuits, peripherals, bridges, etc. are illustrated in FIG. 2, other embodiments may implement any number of one or more of each component, as desired.

In other embodiments, the location of the IOMMU 40 and the guest interrupt manager 38 may vary. For example, one or both may be in the bridge 48, in the peripherals 52A-52B, in another bridge coupled to the bridge, etc.

In the illustrated embodiment, each gAPIC 34A-34D and hAPIC 32A-32B is associated with a particular processor 30A-30B as illustrated in FIG. 2. Thus, a given interrupt controller is dedicated to the corresponding processor 30A-30B in this embodiment. More particularly, in FIG. 2: the hAPIC 32A and the gAPICs 34A and 34C are dedicated to the processor 30A; and the hAPIC 32B and the gAPICs 34B and 34D are dedicated to the processor 30B. An interrupt controller may signal an interrupt to its corresponding processor in any fashion. Generally, the signalling may indicate that an interrupt is needed. The signalling may include the interrupt vector, or the interrupt vector may be read by software executed after the interrupt is delivered. Delivering the interrupt may refer to signalling the processor and the processor accepting the interrupt, in an embodiment. Servicing an interrupt may refer to executing an interrupt service routine associated with the interrupt vector to perform the operations needed by the interrupting device.

Figure 3:
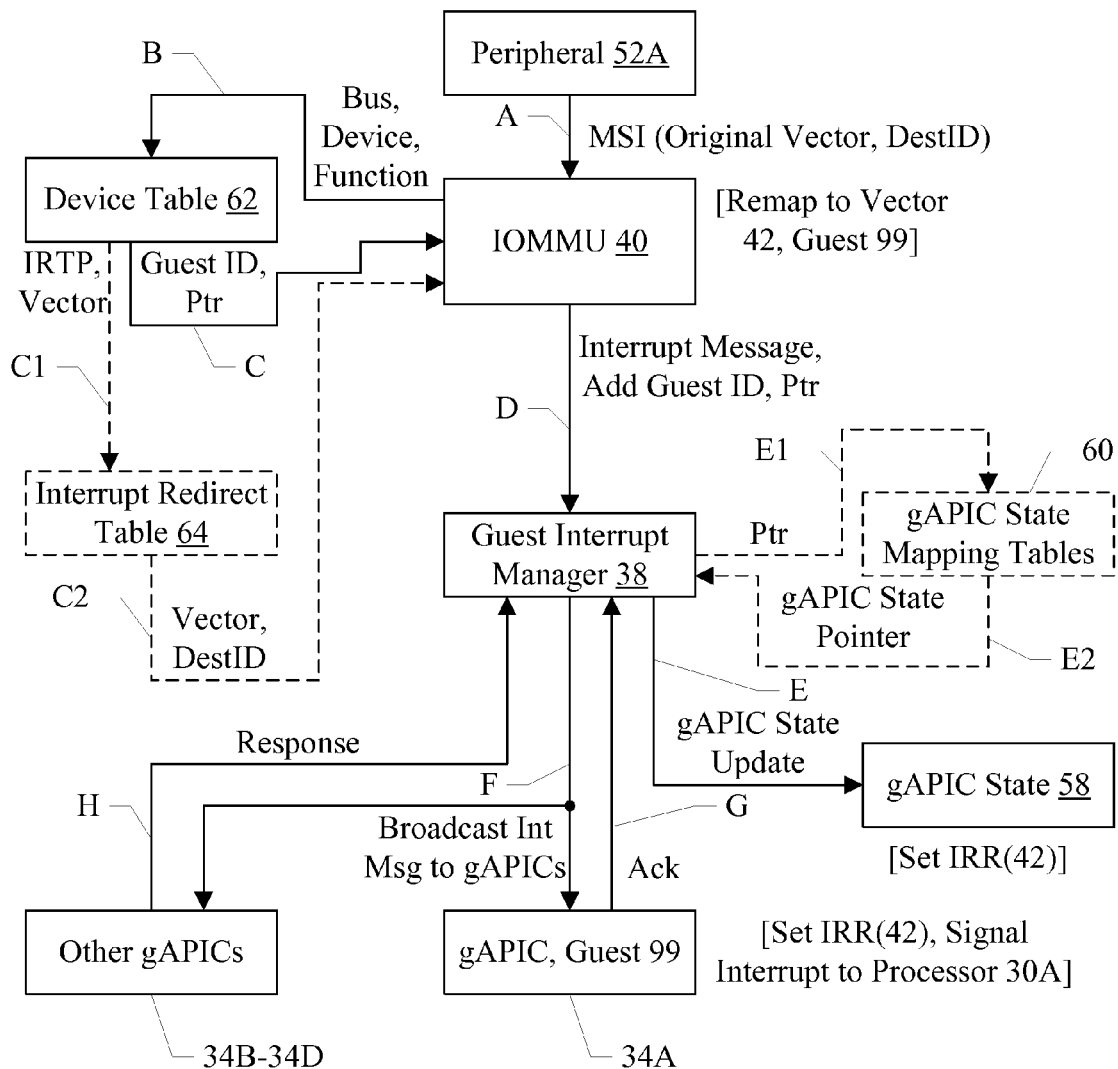
FIG. 3 is a block diagram illustrating one embodiment of an interrupt being delivered to a guest.

Turning now to FIG. 3, a block diagram is shown illustrating progression of an interrupt from a peripheral to a gAPIC, for one embodiment. Interrupts from other processors (inter-processor interrupts, or IPIs) may be transmitted to the guest interrupt manager 38 as well, and may be handled from that point forward similar to FIG. 3. Alternatively, the gAPIC that receives the IPI from the processor initiating the IPI may transmit an update to the guest interrupt manager 38 (to update the gAPIC state for a receiving guest if that guest is inactive) and may also transmit the IPI (including a guest ID) to the other gAPICs.

In the illustrated embodiment, the peripheral 52A determines that an interrupt is desired. The IOAPIC 54 within the peripheral 52A (see FIG. 2) may generate the interrupt message responsive to operation of the peripheral 52A. Specifically, the IOAPIC 54 may generate the interrupt vector that corresponds to the desired interrupt (e.g. based on the service needed by the peripheral 52A, the specific function signalling the interrupt if the peripheral 52A implements multiple functions, etc.). The interrupt vector is part of the interrupt communication, and may be used by software to identify interrupt sources, prioritize interrupts, etc. In some cases, the interrupt vector may be remapped by the IOMMU 40, so the interrupt vector is illustrated as the "original vector" in FIG. 3. The peripheral 52A may transmit the interrupt message to the IOMMU 40 (arrow A). In this embodiment, the interrupt may be transmitted in the form of a message-signalled interrupt (MSI), e.g. as defined in the PCIe specification. Other embodiments may transmit the interrupt in any desired fashion. Generally, the transmission may identify the interrupt, its delivery mode (e.g. logical or physical), and the destination ID (DestID) of the interrupt.

The IOMMU 40 may receive the MSI. The MSI includes an identifier of the peripheral. For example, interfaces that implement the PCI programming model may identify each device with a bus number and a device number on that bus (allowing for multiple PCI interfaces to exist in a system in hierarchical and/or parallel form). Devices may have multiple "functions", which may be separate virtual devices on the physical device, or a partitioning of operations on the device. The identifier may include the function number also. Thus, in this embodiment, the identifier may be referred to as the Bus-Device-Function, or BDF. The IOMMU 40 may index into the device table 62 using the BDF (arrow B), and may identify a device table entry corresponding to the peripheral 52A. The entry may include the guest ID and a pointer to the gAPIC state mapping tables 60 or the gAPIC state data structure 58, in some embodiments (arrow C). In this embodiment, the device table entry may also include an interrupt redirect table pointer (IRTP) that may identify an interrupt redirect table 64 corresponding to the device (arrow C1). The interrupt redirect table 64 may be indexed by the original interrupt vector, and may provide an output vector and destination ID (DestID, e.g. logical or physical APIC ID) for the interrupt (arrow C2).

FIG. 3 illustrates an example in which the MSI is remapped to vector 42, guest ID 99. The remapping may include adding the guest ID, and the vector may also be changed in cases in which the interrupt redirect table 64 is used. Otherwise, the original interrupt vector from the MSI is provided in the interrupt message. Points in FIG. 3 where the specific example of interrupt vector 42 and guest ID 99 is used are illustrated as enclosed in square brackets, i.e. [ ].

The IOMMU 40 may transmit an interrupt message to the guest interrupt manager 38, including the guest ID (e.g. 99 in this example). The interrupt message also includes the interrupt vector (e.g. 42 in this example) and the destination ID. The interrupt message may also include the pointer to the gAPIC state mapping tables 60 or gAPIC state data structure 58 (arrow D).

In embodiments that implement the gAPIC state mapping tables 60, the guest interrupt manager 38 may use the pointer and potentially other information such as the guest ID and/or the destination ID to locate a gAPIC state pointer in the gAPIC state mapping tables 60 (arrow E1, and returning pointer to the guest interrupt manager 38 is shown as arrow E2). The gAPIC state pointer may identify a gAPIC state entry in the gAPIC state data structure 58, and the guest interrupt manager 38 may use the gAPIC state pointer to perform a gAPIC state update in the gAPIC state data structure 58 (arrow E). In this example, the gAPIC state update may set the bit in the interrupt request register that corresponds to vector 42. The interrupt request register (IRR) is described in more detail below with regard to FIG. 4.

In one embodiment, the update to the gAPIC state 58 may be atomic. For example, the guest interrupt manager 38 may generate an atomic OR transaction which atomically ORs the interrupt request bit being set into the current state of the interrupt request register in the gAPIC state entry. An atomic operation may be an operation which is performed effectively as a unit, even if the operation is implemented as multiple steps. An observer attempting to access a location being atomically updated either receives the value prior to the atomic update, or after the atomic update, but may not receive an intermediate value. An observer attempting to update the location being atomically updated either performs its update before the atomic operation, or after the atomic operation completes, but not during the atomic operation. While this embodiment may implement an atomic OR, other embodiments may implement a more general atomic update operation. For example, the atomic update may include an AND mask identifying bits of the target that should be unmodified, and an OR mask identifying which bits to be ORed in. Other implementations are possible as well. For example, a compare and swap implementation may be used in which the original value from the memory location is read and a compare and swap operation is performed against the original value with the new value ORed in. If the compare fails, the process may be repeated (reading a new original value, and performing the compare and swap). Backoff and/or timeout mechanisms may be used to fail out of the loop, if needed.

The guest interrupt manager 38 may also broadcast the interrupt message, including the interrupt vector, the guest ID, and the destination ID, to the gAPICs 34A-34D (arrow F). One of the gAPICs (gAPIC 34A in FIG. 3) may have the guest ID 99 and a logical or physical APIC ID that matches the destination ID, and thus the gAPIC 34A may respond to the interrupt message with an acknowledgement (Ack) indicating that it has accepted the interrupt message (arrow G). The gAPIC 34A may also update its interrupt request register to set the bit corresponding to the vector 42 in this example. If the interrupt is higher priority than any in-progress interrupt (if any) and/or the processor's task priority, the gAPIC 34A may also signal the interrupt to the processor 30A. The other gAPICs 34B-34D may respond to the broadcast interrupt message, but may not acknowledge acceptance since they are not the target of the interrupt (arrow H). For logical interrupts, there may be more than one acknowledgement if the logical interrupt identifies multiple targets.

Using the above mechanism, the guest interrupt manager 38 need not be "aware" of which gAPIC 34A-34D is assigned to which guest. Other embodiments are contemplated in which the guest interrupt manager 38 tracks which gAPIC 34A-34D is assigned to which guest and which transmits the interrupt only to the targeted gAPICs. The guest interrupt manager 38 may track the gAPICs automatically, or may be programmed by the VMM 18 each time a gAPIC is reassigned to another guest. In such an embodiment, the guest interrupt manager 38 may only transmit the interrupt message to the targeted gAPICs.

The transmission of an interrupt to the hAPICs 32A-32B may be performed in the normal APIC manner. Specifically, the interrupt may not be operated upon by the guest interrupt manager 38, but may be similar to the operation of FIG. 3 in other respects, in an embodiment.

It is noted that, while the guest interrupt manager 38 is illustrated as a block herein, the circuitry implementing the guest interrupt manager 38 may be distributed. For example, in an embodiment, the portion of the guest interrupt manager 38 that receives the pointer, optionally processes the gAPIC state mapping table 60, and generates the update for the gAPIC state data structure 58 may be included in the IOMMU 40, so the IOMMU 40 transmits an atomic OR for the gAPIC state data structure 58 and the interrupt message to be transmitted to the gAPICs 34A-34D. Any implementation of the guest interrupt manager 38 in one or more physical locations may be used.

Figure 4:
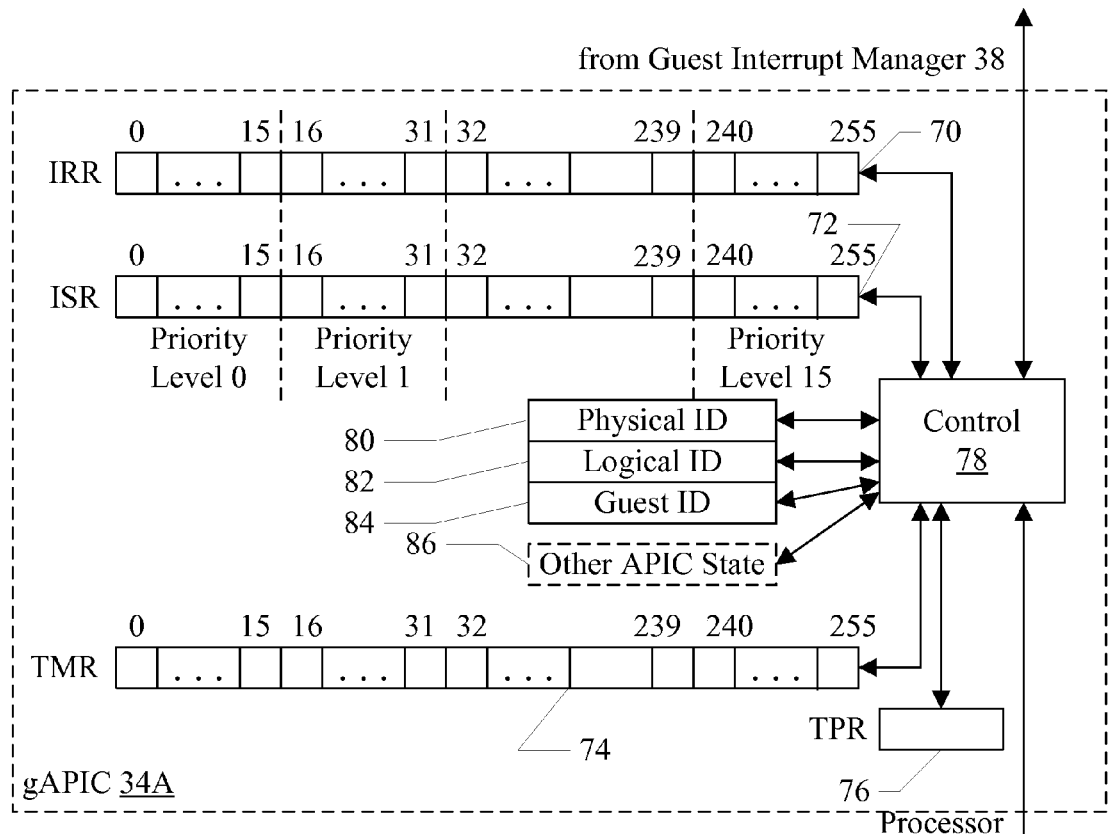
FIG. 4 is a block diagram illustrating one embodiment of a guest advanced programmable interrupt controller (APIC).

Turning now to FIG. 4, a block diagram of one embodiment of the gAPIC 34A is shown. Other gAPICs 34B-34D may be similar. In the embodiment of FIG. 4, the gAPIC 34A includes an interrupt request register (IRR) 70, an interrupt service register (ISR) 72, a trigger mode register (TMR) 74, a task priority register (TPR) 76, a control unit 78, a physical ID register 80, a logical ID register 82, a guest ID register 84, and optionally other APIC state 86. The control unit 78 is coupled to the IRR 70, the ISR 72, the TMR 74, the TPR 76, the physical ID register 80, the logical ID register 82, the guest ID register 84, and the other APIC state 86. Additionally, the control unit 78 is coupled to communicate with guest interrupt manager 38 to receive interrupts, and to the processor interface to communicate with the processor 30A.

In response to receiving an interrupt message from the guest interrupt manager 38, the control unit 78 may be configured to write the interrupt in the IRR 70 if the interrupt is targeted at the guest corresponding to the gAPIC 34A. The position of the interrupt request in the IRR corresponds to the interrupt vector. The IRR may track the "fixed" interrupts. Other interrupt types may include non-maskable interrupt (NMI), system management interrupt (SMI), legacy external interrupt (extINT), etc. These interrupts may be handled as part of the other APIC state 86.

In one embodiment, the interrupt message may also include a trigger mode for each interrupt (level or edge). The TMR 74 may store an indication of which trigger mode applies to the interrupt. For example, edge triggered interrupts may be represented by a binary 0 in the TMR 74 and level triggered may be represented by a binary 1. In other embodiments, only edge triggered interrupts may be supported in the gAPIC 34A, and the TMR 74 (and its copy in the gAPIC state data structure 58) may be eliminated. In another embodiment, the TMR 74 may be repurposed to permit the VMM 18 to log virtual level sensitive interrupts. The VMM 18 may set various bits in the TMR 74 to indicate that, if an end of interrupt is signalled by the processor 30A for the corresponding interrupt vector, the processor 30A exits to the VMM 18.

For fixed interrupts, the gAPIC 34A may be configured to prioritize the interrupt requests and in-service interrupts to determine if an interrupt request should be delivered to the processor. Generally, if the highest priority interrupt request is higher priority than the highest priority in-service interrupt (where an interrupt is in-service if the processor has interrupted its software execution to execute the interrupt handler corresponding to the interrupt), the control unit 78 may be configured to deliver the requested interrupt to the processor 30A. Additionally, the TPR 76 may be programmed by software to establish the minimum priority level of interrupt that is being accepted by the processor 30A. The control unit 78 may be configured to deliver the highest priority interrupt request if it is higher priority than the highest priority in-service interrupt and if it is higher priority than the priority indicated in the TPR 76.

When the processor 30A takes the interrupt, the processor may respond with an interrupt acknowledge command to the gAPIC 34A. The control unit 78 may be configured to remove the highest priority interrupt request from the IRR 70 and log the interrupt as in-service in the ISR 72. The position of the in-service indication corresponding to the interrupt in the ISR may correspond to the interrupt vector of the interrupt. The processor 30A may execute the interrupt service routine (or routines) to service the interrupt. The interrupt service routine may end with an end of interrupt (EOI) command to the gAPIC 34A to signal that the interrupt service is completed. The control unit 78 may be configured to remove the highest priority in-service interrupt from the ISR 72 in response to the EOI command.

Each of the IRR 70, the ISR 72, and the TMR 74 include a location corresponding to each interrupt vector supported by the gAPIC 34A. In the illustrated embodiment, vectors 0 through 255 are supported. The interrupt vector number may also be indicative of its relative priority with other interrupts (e.g. higher vector numbers are higher priority than lower vector numbers, or vice versa in other embodiments). For each interrupt vector, the IRR 70 stores an interrupt request bit indicating whether or not an interrupt is requested at that interrupt vector. For example, the indication may be a bit indicative of a request when set and indicative of no request when clear. Similarly, for each interrupt vector, the ISR 72 stores an in-service bit indicative of whether or not an interrupt is in service for that interrupt vector (e.g. indicative of an in-service interrupt when set and no in-service interrupt when clear). For each interrupt vector, the TMR 74 stores the trigger mode. For each of the IRR 70, the ISR 72, and the TMR 74, the bit location in the register is equal to the interrupt vector number that corresponds to the interrupt.

In the illustrated embodiment, the interrupts are logically arranged into groups which are assigned priority levels for determining if a pending interrupt request is to be delivered to the processor. For example, interrupt vectors 0 to 15 are assigned priority level 0, interrupt vectors 16 to 31 are assigned priority level 1, etc. up to interrupt vectors 244 to 255 at priority level 15. In this embodiment, increasing priority level numbers indicate higher priority level. The control unit 78 may compute a request priority level, which is the highest priority level for which at least one interrupt request is pending in the IRR 70. The control unit 78 may also compute an in-service priority level, which is the highest priority level for which at least one interrupt is indicated as in service in the ISR 72. The control unit 78 may deliver an interrupt if the request priority level exceeds the in-service priority level and also exceeds the priority level indicated in the TPR 76. It is noted that, while 256 interrupt vectors are supported in 16 priority level groups in the illustrated embodiment, more or fewer interrupt vectors and/or more or fewer priority level groups may be supported in other embodiments.

The physical ID register 80 and the logical ID register 82 may store the physical APIC ID and the logical APIC ID assigned to the gAPIC 34A, respectively. The guest ID register 84 may store the guest ID assigned to the gAPIC 34A. Accordingly, the control unit 78 may be configured to accept an interrupt from the guest interrupt manager 38 if the interrupt's guest ID matches the guest ID in the guest ID register 84 and either the interrupt is physical and the APIC ID in the interrupt matches the physical ID in the physical ID register 80, or the interrupt is logical and the APIC ID in the interrupt matches the logical ID in the logical ID register 82.

The other APIC state 86 may include internally-generated interrupts, timers, the local vector table, etc. In various embodiments, some or all of the other APIC state 86 may be included in the gAPIC 34A or may be virtualized with intercepts to the VMM 18 and VMM 18 emulation of the state.

The hAPICs 32A-32B may be similar to the gAPIC 34A, except that they may not include the guest ID register. Alternatively, the hAPICs 32A-32B and the gAPICs 34A-34D may be instances of the same hardware (if the gAPICs 34A-34D implement all APIC state), and the guest ID register may include an enable bit indicating whether or not the guest ID is valid, or the guest ID register may be programmed to zero to indicate hAPIC.

Figure 5:
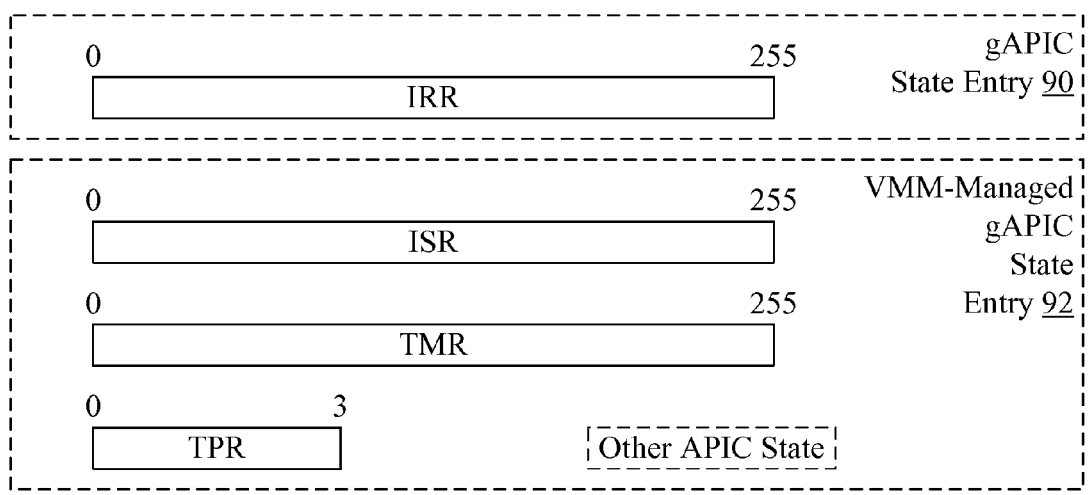
FIG. 5 is a block diagram illustrating one embodiment of a guest APIC state entry in guest APIC state data structure.
Figure 9:
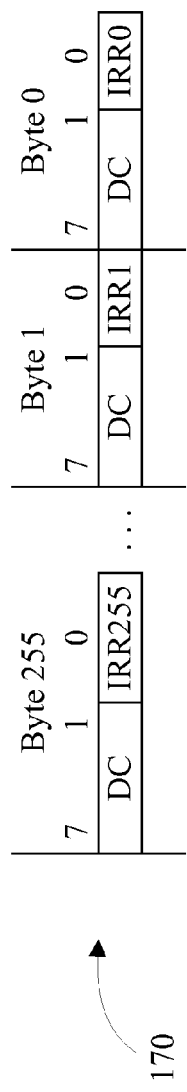
FIG. 9 is a block diagram illustrating one embodiment of arranging interrupt state in a guest APIC state entry.
Figure 12:
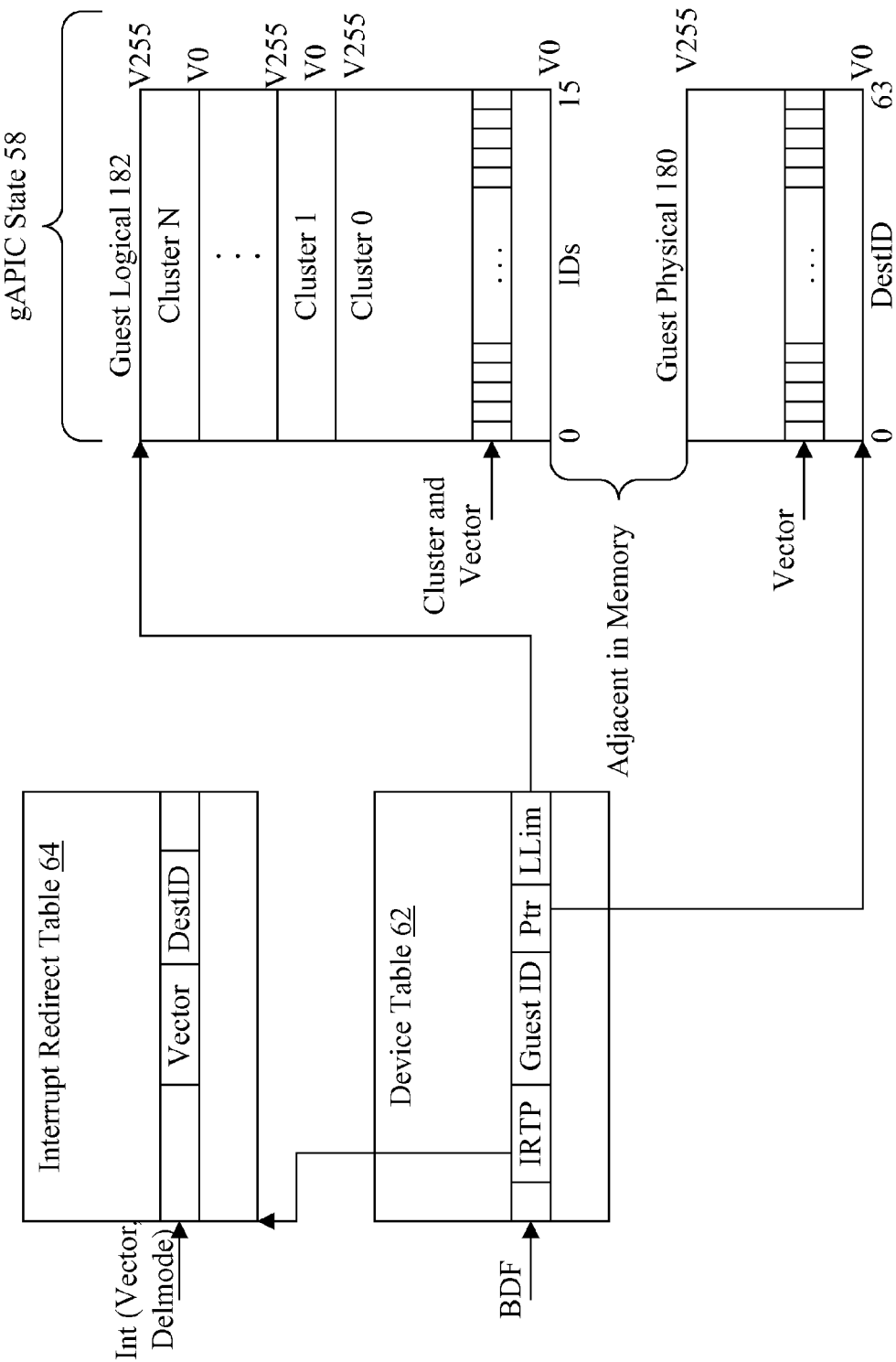
FIG. 12 is a block diagram illustrating yet another embodiment of locating a guest APIC state entry for an interrupt.
Figure 13:
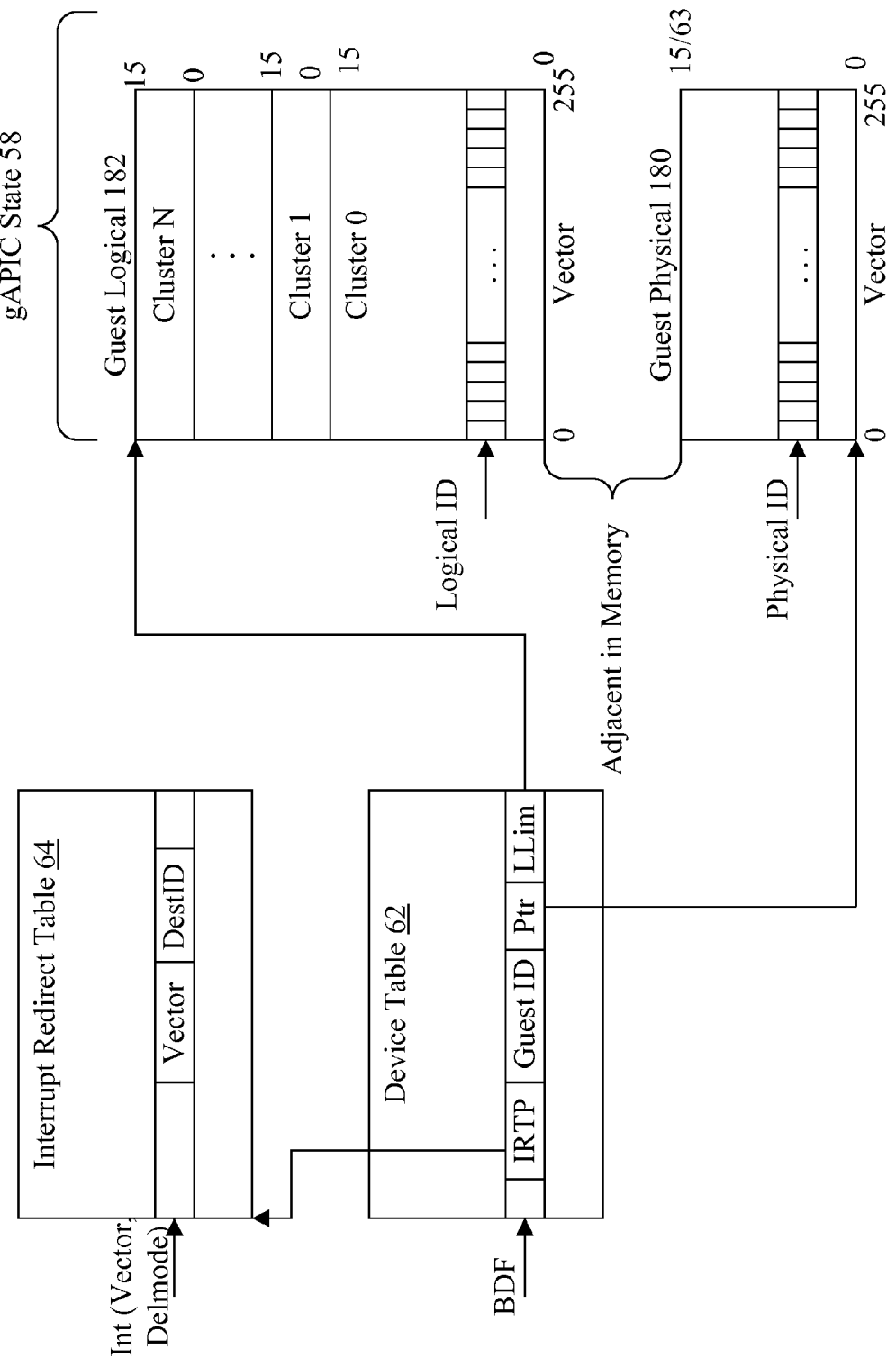
FIG. 13 is a block diagram illustrating still another embodiment of locating a guest APIC state entry for an interrupt.

Turning now to FIG. 5, a block diagram of one embodiment of one embodiment of the gAPIC state entry 90 and one embodiment of a VMM-managed gAPIC state entry 92 is shown. The illustration in FIG. 5 may be the logical view of the state. The actual arrangement of the state in memory may vary, as illustrated in FIG. 9, 12, or 13 for some embodiments.

Generally, the gAPIC state entry 90 may include at least the gAPIC state that may change while the guest corresponding to the gAPIC state is not active. In the present embodiment, a peripheral device may signal an interrupt to a guest, which may change the IRR state. However, the ISR state may only change when the vCPU in the guest accepts the interrupt, which may not occur when the guest is not active. Similarly, the TPR is changed by the vCPU, and thus may not change while the guest is not active. The VMM 18 may manage the saving and restoring of such state in the VMM-managed gAPIC state entry 92.

Accordingly, for an embodiment of the gAPIC 34A similar to FIG. 4, the gAPIC state entry 90 may include the state of the IRR 70. The VMM-managed gAPIC state entry 92 may include the state of the ISR 72, the TMR 74, the TPR 76, and various other APIC state 86. The VMM-managed gAPIC state entry 92 may also store the guest ID and logical and physical IDs, or those may be inherent in selecting the entry 92 (that is, the VMM 18 may use those values to select the entry 92 from the data structure 68).

Figure 6:
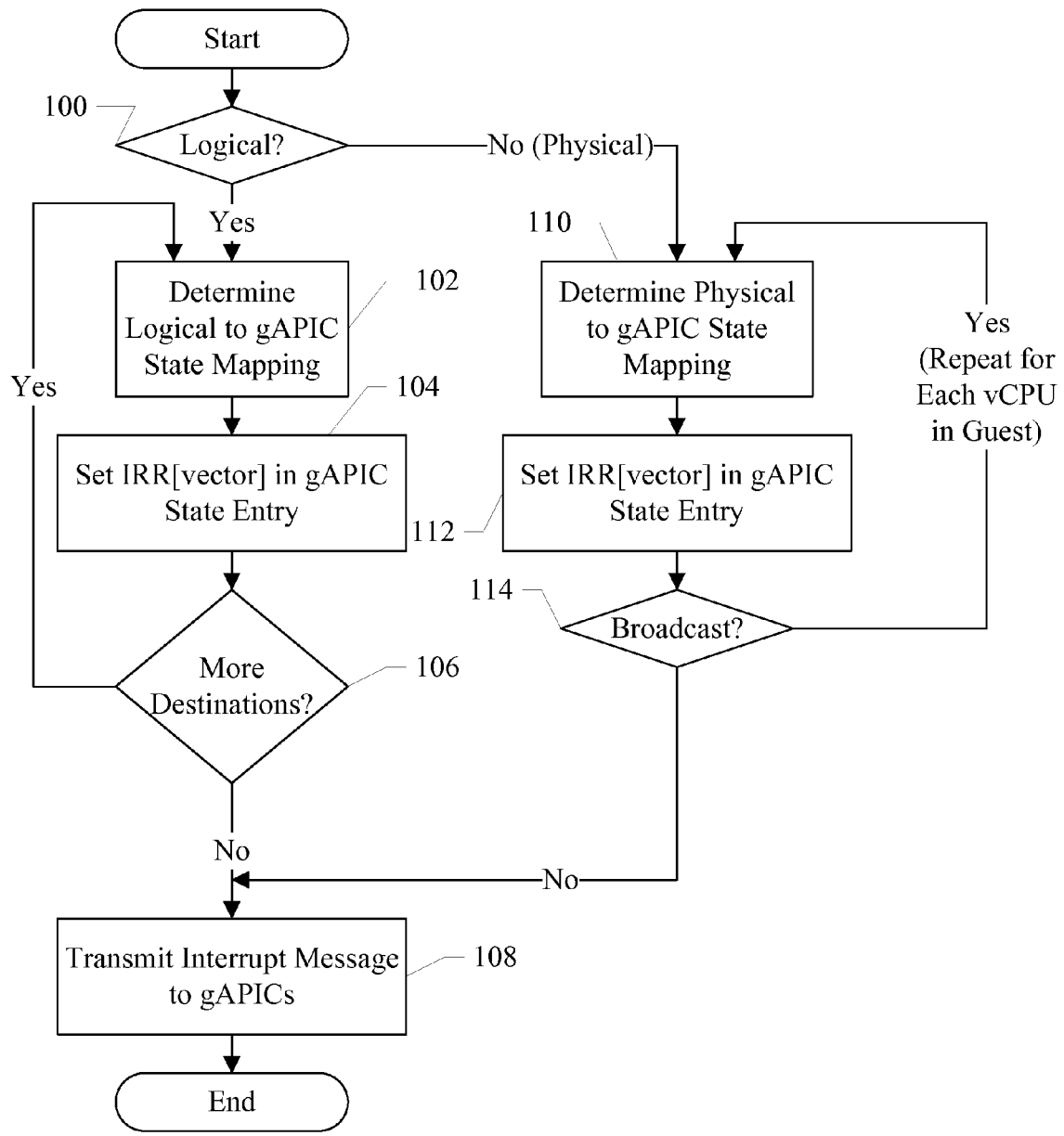
FIG. 6 is a flowchart illustrating operation of one embodiment of a guest interrupt manager shown in FIG. 2 in response to receiving an interrupt that is targeted to a guest.

Turning next to FIG. 6, a flowchart is shown illustrating operation of one embodiment of the guest interrupt manager 38 in response to receiving an interrupt message from the IOMMU 40 for a guest. While the blocks are shown in a particular order for ease of understanding, other orders may be used. Blocks may be performed in parallel in combinatorial logic in the guest interrupt manager 38. Blocks, combinations of blocks, and/or the flowchart may be pipelined over multiple clock cycles. Generally, the guest interrupt manager 38 may be configured to implement the operation illustrated in FIG. 6.

In some embodiments, the processing of the interrupt message may vary dependent on whether the interrupt is logical or physical (that is, dependent on whether the delivery mode of the interrupt is logical or physical). For example, in the embodiment of FIG. 11, different tables are read for logical interrupts and physical interrupts. In FIGS. 12 and 13, the logical and physical tables may be adjacent in memory, but an offset may be added to the base address pointer to locate the logical table for a logical interrupt and no offset need be added for a physical interrupt. Accordingly, the guest interrupt manager 38 may be configured to determine if the interrupt is logical or physical (decision block 100). Other embodiments may not vary based on the delivery mode, and the decision block 100 may be eliminated (and the check for broadcast or more destinations, discussed below, may be merged into a check for both).

If the interrupt is logical (decision block 100, "yes" leg), the guest interrupt manager 38 may be configured to determine the mapping from the logical interrupt to a corresponding gAPIC state entry 90 in the gAPIC state data structure 58 (block 102). Various embodiments may implement different mappings, as illustrated in FIGS. 10-13, and thus the determination may vary. The guest interrupt manager 38 may be configured to set the bit corresponding to the interrupt vector in the IRR represented in the gAPIC state entry 90 (block 104). Logical interrupts may have multiple destinations (e.g. the destination within a cluster is a bit vector which may have more than one set bit). If the logical interrupt includes more destinations (decision block 106, "yes" leg), the guest interrupt manager 38 may be configured to repeat blocks 102 and 104 for each additional destination. Alternatively, in the embodiment of FIG. 12, the logical destination bit vector may be written to the gAPIC state entry in one operation, as described in more detail below. The guest interrupt manager 38 may be configured to transmit the interrupt message to the gAPICs 34A-34D (block 108).

If the interrupt is physical (decision block 100, "no" leg), the guest interrupt manager 38 may be configured to determine the mapping from the physical interrupt to a corresponding gAPIC state entry 90 in the gAPIC state data structure 58 (block 110). Various embodiments may implement different mappings, as illustrated in FIGS. 10-13, and thus the determination may vary. The guest interrupt manager 38 may be configured to set the bit corresponding to the interrupt vector in the IRR represented in the gAPIC state entry 90 (block 112). Physical interrupts may be broadcast or single destination. If the physical interrupt is broadcast (decision block 114, "yes" leg), the guest interrupt manager 38 may be configured to repeat blocks 110 and 112 for each destination in the guest's virtual machine (e.g. each vCPU). Alternatively, in the embodiment of FIG. 12, the broadcast may be recorded in the gAPIC state entry in one operation, as described in more detail below. The guest interrupt manager 38 may be configured to transmit the interrupt message to the gAPICs 34A-34D (block 108).

The setting of the bit in the IRR represented in a gAPIC state entry 90 may be performed as an atomic OR operation, in which the set bit is ORed into the other IRR bits in the memory location. The actual implementation of the atomic OR operation may vary, from a locked read/modify/write operation to special purpose circuitry defined to perform the OR as one operation. As mentioned above, a compare and swap operation may be performed, in other embodiments.

In another embodiment, logical interrupts with more than one destination and physical interrupts that are broadcast may be handled by the guest interrupt manager 38 by logging the interrupt in a data structure accessible to the VMM 18 (e.g. an event queue). The guest interrupt manager 38 may also be configured to signal the VMM 18 (e.g. causing an exit from a virtual machine on one of the processors 30A-30B) to inform the VMM 18 of the event. Alternatively, the guest interrupt manager 38 may only signal the VMM 18 periodically (e.g. once every N milliseconds and/or at a high watermark in the event queue) and the VMM 18 may check the event queue periodically as well to service any events more rapidly than the signalling might support. In one embodiment, the event queue may be managed by the IOMMU 40 instead of the guest interrupt manager 38.

Figure 7:
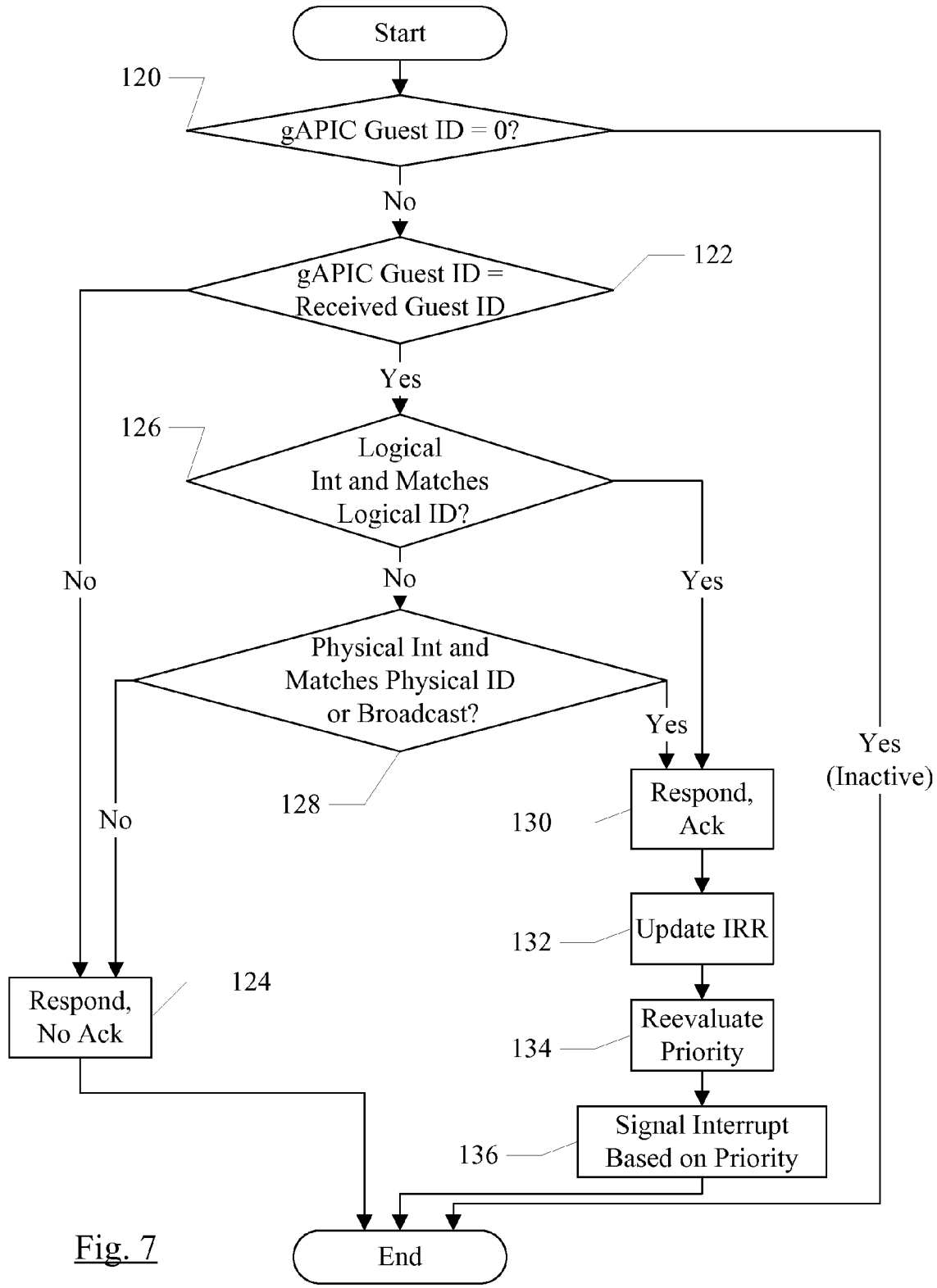
FIG. 7 is a flowchart illustrating operation of one embodiment of a guest APIC in response to receiving an interrupt message.

Turning now to FIG. 7, a flowchart is shown illustrating operation of one embodiment of a gAPIC 34A-34D in response to receiving an interrupt message from the guest interrupt manager 38. While the blocks are shown in a particular order for ease of understanding, other orders may be used. Blocks may be performed in parallel in combinatorial logic in the gAPIC. Blocks, combinations of blocks, and/or the flowchart may be pipelined over multiple clock cycles. Generally, the gAPIC may be configured to implement the operation illustrated in FIG. 7.

In one embodiment, the gAPIC is deactivated by setting its guest ID (in the guest ID register 84, see FIG. 4) to zero. Thus, in response to receiving an interrupt message, if the gAPIC's guest ID is zero (decision block 120, "yes" leg), the gAPIC is inactive and may not process the interrupt. Other embodiments may deactivate a gAPIC in other ways (e.g. an active bit in a register) and the decision block 120 may be modified accordingly to check for gAPIC active/inactive.

If the gAPIC's guest ID is non-zero, the gAPIC may be configured to compare the guest ID to the guest ID of the received interrupt as well as comparing the received destination ID to the logical ID and the physical ID in the registers 80 and 82, respectively (see FIG. 4). If the gAPIC's guest ID does not match the received guest ID (decision block 122, "no" leg), the gAPIC is currently assigned to a different guest and the gAPIC is therefore not targeted by the interrupt. The gAPIC may be configured to respond with a non-acknowledgement of the interrupt (block 124). The non-acknowledgement may indicate that the gAPIC has received the interrupt but has determined that the interrupt is not targeted at the corresponding processor and thus has not been accepted. Similarly, if the gAPIC's guest ID matches the received guest ID, but the interrupt is logical and does not match the gAPIC's logical ID or the interrupt is physical, single destination, and does not match the gAPICs physical ID (decision blocks 126 and 128, "no" legs), the gAPIC may be configured to respond with a non-acknowledgement of the interrupt (block 124).

Matching a logical interrupt may generally include comparing the cluster ID portion of the logical IDs for equality, and detecting that the set bit in the gAPIC's logical ID register is also set in the destination portion of the logical ID received from the interrupt. Other bits in the destination portion of the interrupt's logical ID may also be set if there is more than one logical destination. The physical IDs may be compared for equality, except that a broadcast physical interrupt may be treated as a match as long as the guest ID matches.

If the interrupt is logical and matches the logical ID (decision block 126, "yes" leg) or the interrupt is physical and matches the physical ID or is broadcast (decision block 128, "yes" leg), the gAPIC may be configured to respond to the guest interrupt manager 38 with an acknowledgement indicating that the gAPIC is accepting the interrupt for presentation to the corresponding processor 30A-30B (block 130). The gAPIC may also be configured to update the IRR register 70, setting the interrupt request bit corresponding to the interrupt vector in the interrupt message (block 132). The gAPIC may be configured to reevaluate the priority of the interrupt with respect to any in-service interrupts and/or the task priority register (block 134), and may be configured to signal the interrupt to the processor based on the reevaluation (block 136). That is, the gAPIC may be configured to signal the interrupt if the interrupt's priority is higher priority than an in-service interrupt and higher priority than the tack priority register.

Figure 8:
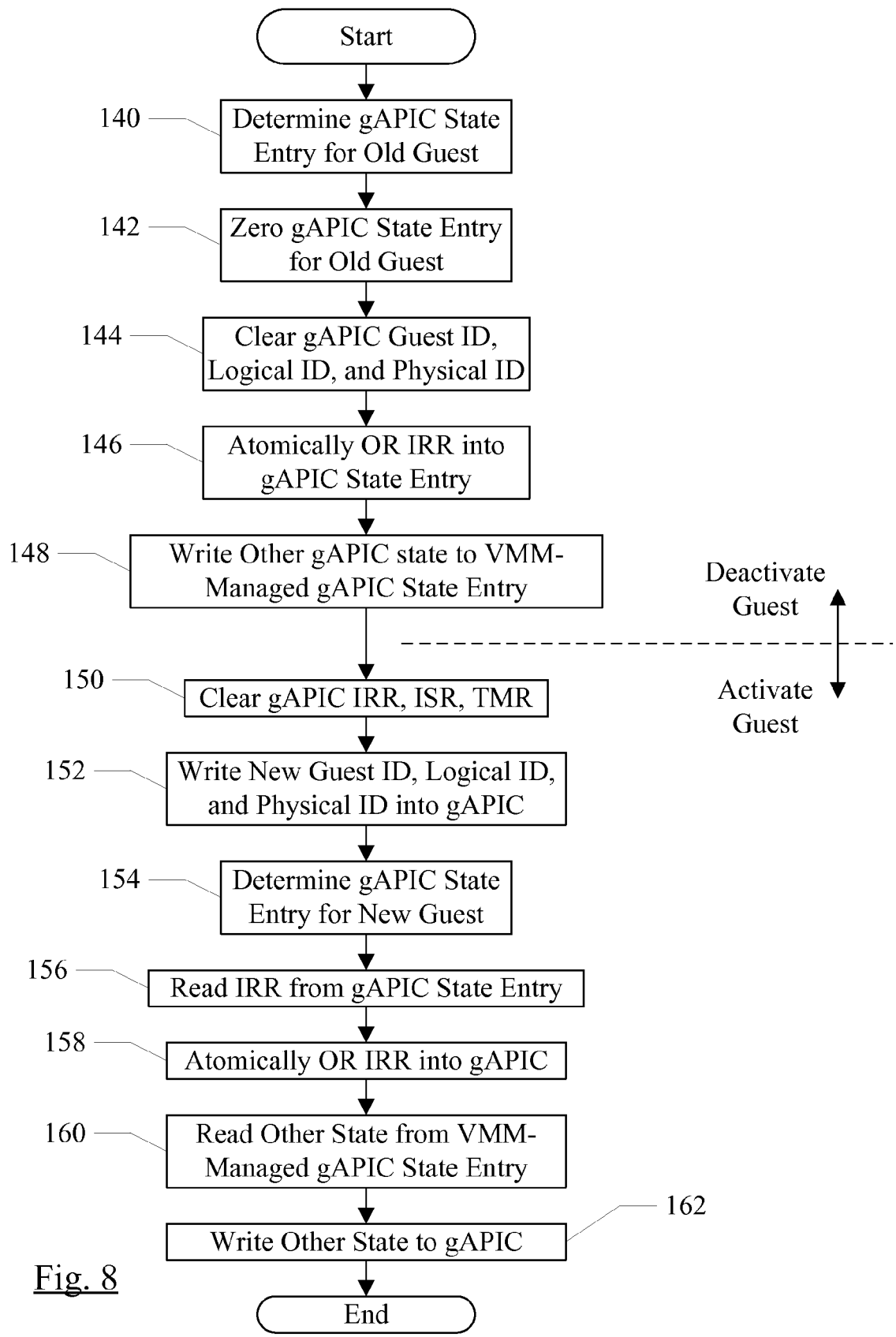
FIG. 8 is a flowchart illustrating operation of one embodiment of a virtual machine monitor to change guest APIC state from one guest to another.

Turning now to FIG. 8, a flowchart is shown illustrating operation of one embodiment the VMM 18 to change gAPIC state from one guest to another. That is, the flowchart of FIG. 8 may represent reassigning a gAPIC 34A-34D from one guest/vCPU to another guest, or another vCPU in the same guest. While the blocks are shown in a particular order for ease of understanding, other orders may be used. Generally, the VMM 18 may include instructions which, when executed on the system 5, implement the operation illustrated in FIG. 8.

The VMM 18 may determine the location of the gAPIC state entry 90 corresponding to the "old guest" (the guest that is being deactivated from the gAPIC) in the gAPIC state data structure 58 (block 140). The data in the gAPIC state entry 90 is considered "stale", since it may have been modified by the gAPIC. For example, an IRR bit may have been reset responsive to delivering the interrupt to the corresponding processor. Accordingly, the VMM 18 may zero the IRR in the gAPIC state entry 90 (block 142). The VMM 18 may clear the guest ID register 84, the logical ID register 82, and the physical ID register 80 (block 144). This action may stop the gAPIC from accepting any additional interrupts, since the guest ID, logical ID, and physical ID will not match any interrupt messages. It is possible that an interrupt may have been transmitted after the registers 80-84 are cleared (block 144) and before the IRR state is written to the gAPIC state entry 90. Accordingly, to prevent loss of interrupt state, the VMM 18 may atomically OR the IRR state from the IRR 70 into the gAPIC state entry 90 (block 146). The VMM 18 may also write other gAPIC state to the VMM-managed gAPIC state entry 92 associated with the old guest (block 148).

The VMM 18 may clear the gAPIC's IRR, ISR, and TMR registers 70, 72, and 74 to remove the interrupt state of the old guest (block 150). The VMM 18 may write the new guest ID, logical ID, and physical ID for the guest that is being assigned to the gAPIC into the guest ID register 84, the logical ID register 82, and the physical ID register 80, respectively (block 152). Once block 152 is performed, the gAPIC may begin accepting interrupts for the guest. The VMM 18 may determine the gAPIC state entry 90 for the "new guest" (the guest being activated in the gAPIC) (block 154), and may read the IRR state from the gAPIC state entry 90 (block 156). Since the programming of the registers 80-84 may cause the gAPIC to begin accepting interrupts, it is possible that the gAPIC has accepted an interrupt in the IRR that was recorded in the gAPIC state entry 90 after the VMM 18 read the entry. Accordingly, the VMM 18 may atomically OR the IRR state into the IRR register 70. That is, the gAPIC may support an atomic OR operation on the IRR register 70 (block 158). The VMM 18 may read the other state from the VMM-managed gAPIC state entry 92 for the new guest (block 160) and may write the state to the gAPIC (block 162). It is noted that blocks 160 and 162 may also be performed at any other point after block 150.

Blocks 140-148 may generally represent the operations for deactivating a guest from a gAPIC, while blocks 150-162 may generally represent the operations for activating a guest in a gAPIC. Accordingly, as illustrated by the horizontal dashed line in FIG. 8, if the VMM 18 wishes only to deactivate a guest in a gAPIC, the blocks above the horizontal dashed line may be performed. If the VMM 18 wishes only to activate a guest in a gAPIC, the blocks below the horizontal dashed line may be performed.

Turning now to FIG. 9, a block diagram illustrating one exemplary arrangement 170 of the gAPIC state in a gAPIC state entry 90 for an embodiment is shown. In the embodiment of FIG. 9, each bit of the IRR is stored in a different byte. For example, IRR bit 0, or IRR0 in FIG. 9, is stored in byte 0 of a set of consecutive bytes in memory; IRR1 is stored in byte 1; etc. to IRR255 being stored in byte 255. In the illustrated embodiment, the IRR bit is stored in bit 0 of the byte, although any bit position may be used. Other bits in the byte are don't cares (DC) in the illustrated embodiment. By storing each bit in a separate byte (the minimum unit of memory access), each bit may be separately written without impacting the other bits. Thus, a bit may be set via a write to a byte, which is an atomic operation. By writing a set bit to the IRR bit position in a byte and not updating other bytes, an atomic OR of the IRR bit may be the result. In other embodiments, the atomic OR may be accomplished in other ways, and the bits of the IRR state may be stored in other ways.

Figure 10:
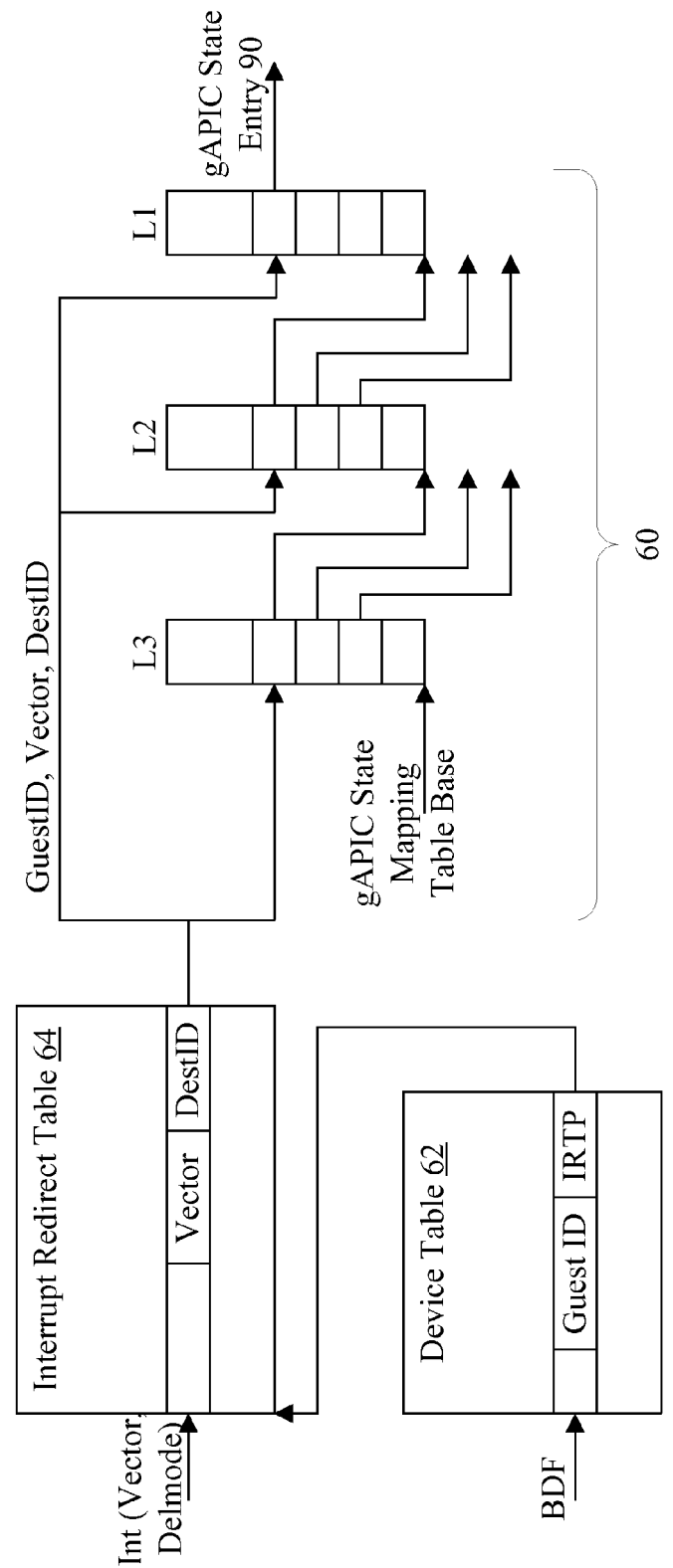
FIG. 10 is a block diagram illustrating one embodiment of locating a guest APIC state entry for an interrupt.

Turning now to FIG. 10, a block diagram of one embodiment of locating a gAPIC state entry 90 is shown. In the illustrated embodiment, the device table 62 and the interrupt redirect table 64 are shown, as well as an embodiment of the gAPIC state mapping tables 60. In the embodiment, the BDF of the peripheral that transmitted the interrupt is used as an index into the device table 62, and the entry may include the guest ID for the guest to which the BDF is assigned. Additionally, in this example, the entry includes a interrupt redirect table pointer (IRTP), which points to the base of the interrupt redirect table 64. The index into the interrupt redirect table 64 is the interrupt identifier for the interrupt. The interrupt identifier may include the interrupt vector, and may also include the delivery mode (Delmode) of the interrupt, either physical or logical. The selected entry may include a new vector and destination ID (DestID). In embodiments that do not use the interrupt redirect table 64, the interrupt vector and destination ID provided by the peripheral may be used directly to index the gAPIC state mapping table 60.

The gAPIC state mapping table 60 may be located in memory via a gAPIC state mapping table base address. The base address may be the same for all guests, may be guest specific, or may be stored in the device table 62, in various embodiments. In FIG. 10, the base address identifies a highest level (L3) of a set of hierarchical tables, which may store pointers to lower level tables (e.g. L2, and similar tables indicated by pointers from L3 that do not point to L2). The L2 tables may store pointers to even lower level tables (L1), which may store pointers to gAPIC state entries 90 in the gAPIC state data structure 58. Other embodiments may use any number of levels in the hierarchy, including more or fewer levels than the 3 levels shown in FIG. 10.

The index into each level L3-L1 in the gAPIC state mapping table 60 may be a portion of the value formed from concatenating the guest ID from the device table 62, the interrupt vector from the peripheral or from the interrupt redirect table 64, and the destination ID from the peripheral or from the interrupt redirect table 64. The indexes to the levels L3-L1 may consume all of the bits of the concatenated value, and thus each combination of guest ID, vector, and destination ID may have its own unique pointer in the gAPIC state mapping tables 60. Some pointers may point to the same gAPIC state entry 90, however (e.g. the logical and physical IDs of the same gAPIC may have pointers to the same gAPIC state 90, in one embodiment).

Figure 11:
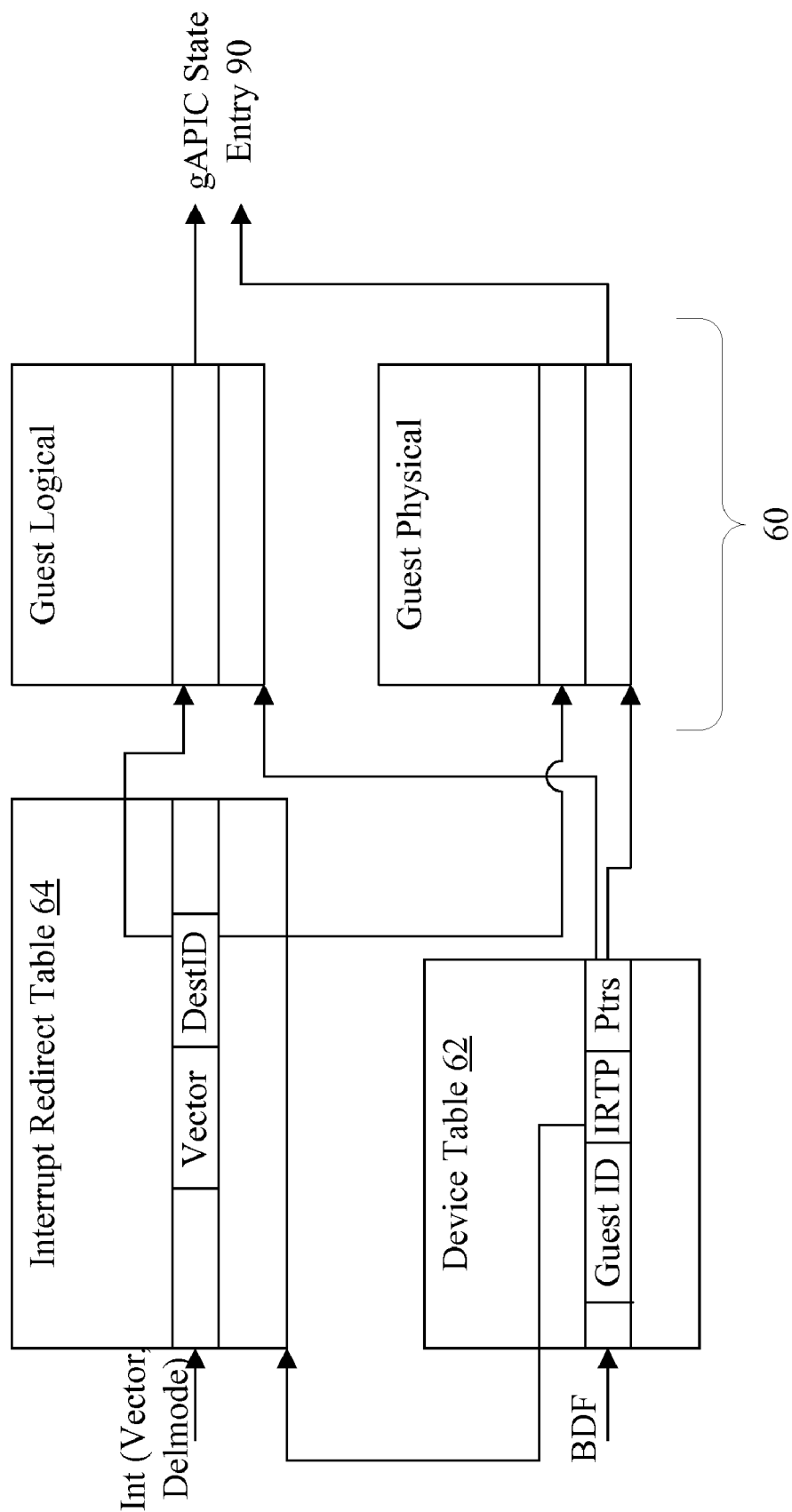
FIG. 11 is a block diagram illustrating another embodiment of locating a guest APIC state entry for an interrupt.

Turning now to FIG. 11, a block diagram of another embodiment of locating a gAPIC state entry 90 is shown. In the illustrated embodiment, the device table 62 and the interrupt redirect table 64 are shown, as well as an embodiment of the gAPIC state mapping tables 60. In the embodiment, the BDF of the peripheral that transmitted the interrupt is used as an index into the device table 62, and the entry may include the guest ID for the guest to which the BDF is assigned. Additionally, in this example, the entry includes a interrupt redirect table pointer (IRTP), which points to the base of the interrupt redirect table 64. The device table 62 may further include one or more pointers to tables in the gAPIC state mapping tables 60. Specifically, a pointer to a guest physical table and another pointer to a guest logical table may be stored. The guest physical table may map physical destination IDs to gAPIC state entries 90. That is, the guest physical table may be indexed by destination ID, and may store pointers to gAPIC state entries 90. Similarly, the guest logical table may map logical destination IDs to gAPIC state entries 90.

The index into the interrupt redirect table 64 is the interrupt identifier for the interrupt. The interrupt identifier may include the interrupt vector, and may also include the delivery mode (Delmode), either physical or logical. The selected entry may include an new vector and destination ID (DestID). In embodiments that do not use the interrupt redirect table 64, the interrupt vector and destination ID provided by the peripheral may be used directly to index the gAPIC state mapping table 60.

Turning next to FIG. 12, a block diagram of another embodiment of locating a gAPIC state entry 90 is shown. In this embodiment, there is no gAPIC state mapping table 60. Similar to the embodiments of FIGS. 10-11, the BDF of the peripheral that transmitted the interrupt is used as an index into the device table 62, and the entry may include the guest ID for the guest to which the BDF is assigned and optionally includes a interrupt redirect table pointer (IRTP), which points to the base of the interrupt redirect table 64. The device table 62 may further include at least one pointer (Ptr) to the base of a table in the gAPIC state data structure 58. In the illustrated embodiment, the table includes a guest physical section 180 and a guest logical section 182. While the sections 180 and 182 are illustrated with space in between in FIG. 12 for clarity in the drawings, the sections 180 and 182 may be adjacent in memory. That is, the top the guest physical section 180 may be adjacent to the bottom of the guest logical section 182. The device table 62 entry may further including a logical limit (LLim) field that indicates the top of the guest logical portion 182. In other embodiments, the guest physical portion 180 and the guest logical portion 182 may not be adjacent and separate pointers may be stored in the device table 62 entry to indicate the guest physical portion 180 and the guest logical portion 182, respectively.

In the embodiment of FIG. 12, the guest physical portion 180 may be indexed by interrupt vector (either from the peripheral, or from the interrupt redirect table 64). Each entry in the guest physical portion 180 may comprise a bit vector corresponding to the destination IDs that are supported in the guest physical machine (e.g. up to 64 destinations, numbered 0 to 63 in FIG. 12). In response to a physical interrupt, the guest interrupt manager 38 may be configured to set the bit in the entry for the interrupt vector that corresponds to the destination ID. For a broadcast interrupt, the guest interrupt manager 38 may be configured to set each bit in the entry corresponding to the interrupt vector, up to the number of vCPUs in the virtual machine.

The guest logical portion 182 may be indexed by the cluster portion of the logical ID and the vector. The cluster portion may be the most significant bits of the index, so the guest logical portion 182 is divided into cluster portions corresponding to each logical cluster (cluster 0 to cluster N in FIG. 12). Within each cluster, entries are arranged by interrupt vector, each entry storing a bit vector corresponding to the vector portion of the logical IDs. In the illustrated embodiment, up to 16 destinations may be included in a cluster (e.g. the bit vector portion of the logical ID may be 16 bits). In response to a logical interrupt, the guest interrupt manager 38 may be configured to logically OR the bit vector portion of the logical ID with the contents of the entry corresponding to the interrupt vector.

Accordingly, the embodiment of FIG. 12 may support the recording of broadcast physical interrupts and of logical interrupts having multiple destinations in a single update to the gAPIC state data structure 58. The gAPIC state entry for a gAPIC may comprise a column of the guest physical portion 180 corresponding the gAPIC's physical ID, logically ORed with a column from the cluster indicated by the gAPIC's logical ID, the column identified by the set bit within the bit vector portion of the gAPIC's logical ID. Updating the gAPIC state data structure 58 in response to deactivating a guest in a gAPIC may include zeroing one of the columns corresponding to the guest and writing the IRR to the other column.

FIG. 13 is another embodiment of locating a gAPIC state entry 90. The embodiment of FIG. 13 is similar to the embodiment of FIG. 12, except that the arrangement of data in the guest physical portion 180 and the guest logical portion 182 is different. Each entry corresponds to an IRR, and thus includes a bit for each interrupt vector. The guest physical portion 180 is indexed by the physical ID of the interrupt, and the guest logical portion 182 is indexed by the logical ID of the interrupt. The IRR bit corresponding to the interrupt vector is set in either the logical portion 182 or the physical portion 180 dependent on the delivery mode of the interrupt. The gAPIC state for the guest/vCPU is the OR of the row from the guest physical portion 180 that corresponds to the physical ID assigned to that guest/vCPU and the row of the guest logical portion 182 that corresponds to the logical ID assigned to that guest/vCPU.

Figure 14:
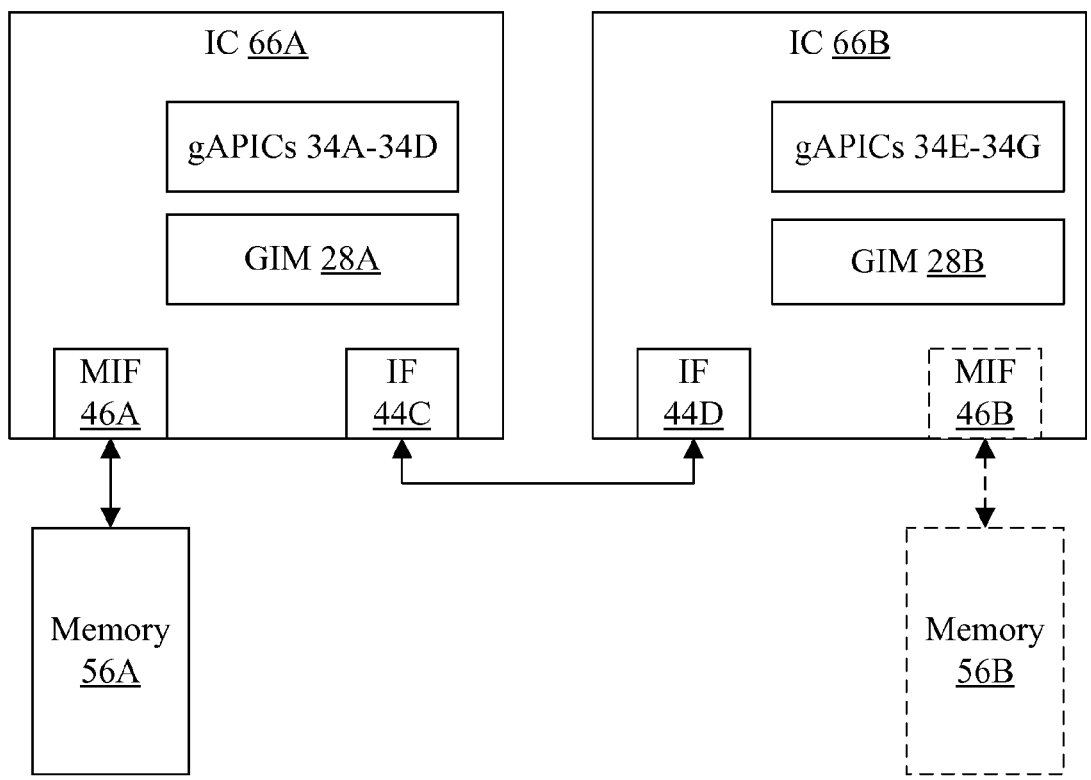
FIG. 14 is a block diagram of another embodiment of the host hardware illustrated in FIG. 1.

Turning now to FIG. 14, a block diagram of another embodiment of the host hardware 20 is shown. In the illustrated embodiment, two integrated circuits 66A-66B are included similar to the integrated circuit 66 in FIG. 2. Thus, as shown, each integrated circuit may include gAPICs such as 34A-34D in the integrated circuit 66A and 34E-34G in the integrated circuit 66B. Each integrated circuit 66A-66B may include a respective guest interrupt manager 28A-28B and IOMMU (not shown in FIG. 14). At least one of the integrated circuits 66A-66B is coupled to a memory 56A-56B, and optionally both integrated circuits 66A-66B may include memories. The integrated circuits 66A-66B are coupled via the interface circuits 44C and 44D in the illustrated embodiment. In other embodiments, more than two integrated circuits 66A-66B may be provided and the various integrated circuits may be interconnected in any desired fashion.

In one embodiment, each guest interrupt manager 28A-28B may be enabled and may manage interrupt messages targeted at gAPICs 34A-34G within the same integrated circuit. Thus, the guest interrupt managers 28A-28B may provide a scalable solution to guest interrupt delivery. The data structures used by the guest interrupt manager 28A-28B may be stored in one memory (e.g. the memory 58A), or each guest interrupt manager 28A-28B may have its own data structures in its own memory 58A-58B. While there may be some contention for access to the data structures, in many cases a peripheral is assigned to a particular guest (which is executing on a processor in one of the integrated circuits 66A-66B), so the amount of actual contention may be relatively small.

In another embodiment, one of the guest interrupt managers 28A-28B may be enabled and may perform the guest interrupt delivery for each gAPIC 34A-34G in the system. Such an embodiment may experience greater interrupt-related traffic over the interconnection between the integrated circuits 66A-66B, but may also provide the conceptual simplicity of a central point for guest interrupt management.

Turning next to FIG. 15, a block diagram of a computer accessible storage medium 200 is shown. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, or DVD-ROM, CD-R, CD-RW, DVD-R, DVD-RW, and/or Blu-Ray discs. Storage media may further include volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface or any other interface, etc. Storage media may include microelectromechanical systems (MEMS), as well as storage media accessible via a communication medium such as a network and/or a wireless link. The computer accessible storage medium 200 in FIG. 15 may store the VMM 18, which may implement the flowchart of FIG. 8 and/or any other functionality assigned to the VMM 18. Generally, the computer accessible storage medium 200 may store any set of instructions which, when executed, implement a portion or all of the flowchart shown in FIG. 8. A carrier medium may include computer accessible storage media as well as transmission media such as wired or wireless transmission.

Numerous variations and modifications will become apparent to those skilled in the art once the above disclosure is fully appreciated. It is intended that the following claims be interpreted to embrace all such variations and modifications.

What is claimed is:

1. A method comprising:
   receiving an interrupt message in an input/output memory management unit (IOMMU), the interrupt message communicating an interrupt, wherein the interrupt is sourced by a peripheral device that is assigned to a first guest of a plurality of guests in a system;
   accessing, by the IOMMU, one or more first data structures in memory to map the interrupt message to the first guest, wherein the one or more first data structures also include a pointer to another memory location;
   locating, by a guest interrupt manager, one or more second data structures in memory responsive to the pointer, wherein the one or more second data structures include interrupt controller state for the first guest;
   recording the interrupt in the one or more second data structures, permitting the interrupt to be delivered to the first guest at a time that the first guest is executing; and
   in addition to recording the interrupt, communicating the interrupt to a first interrupt controller that is assigned to the first guest and that is a destination for the interrupt within the first guest in response to determining that the first guest is executing at a time that the interrupt message is received.

2. The method as recited in claim 1 wherein the system includes a plurality of interrupt controllers that are assignable to guests, and wherein the first interrupt controller is one of the plurality of interrupt controllers, and wherein the communicating comprises transmitting the interrupt message to each of the plurality of interrupt controllers.

3. The method as recited in claim 2 wherein each of the plurality of interrupt controllers includes a guest identifier identifying a guest to which that interrupt controller is assigned, and wherein communicating the interrupt includes communicating a first guest identifier identifying the first guest with the interrupt, and wherein the method further comprises:
   each interrupt controller comparing the guest identifier to the first guest identifier; and
   the first interrupt controller recording the interrupt responsive to the guest identifier in the first interrupt controller matching the first guest identifier.

4. The method as recited in claim 3 wherein each of the plurality of interrupt controllers includes at least one destination identifier within the guest to which that interrupt controller is assigned, and wherein communicating the interrupt includes communicating a first destination identifier associated with the interrupt, and wherein the method further comprises:
   each interrupt controller comparing the destination identifier to the first destination identifier; and
   the first interrupt controller recording the interrupt responsive to the destination identifier in the first interrupt controller matching the first destination identifier.

5. The method as recited in claim 1 wherein the interrupt controller state includes a state of an interrupt request register in the interrupt controller, and wherein the interrupt includes an interrupt vector, and wherein the interrupt request register includes a bit position associated with the vector, and wherein recording the interrupt comprises setting the bit in the bit position in the data structure.

6. The method as recited in claim 5 wherein setting the bit is atomic.

7. The method as recited in claim 5 wherein setting the bit comprises atomically ORing the set bit into the bit position.

8. The method as recited in claim 5 wherein setting the bit is performed using a compare and swap operation.

9. A system comprising:
   a memory system; and
   a guest interrupt manager configured to receive an interrupt message corresponding to an interrupt that is targeted at a guest executable on the system, wherein the guest interrupt manager is configured to record the interrupt in one or more first data structures in the memory system to ensure delivery of the interrupt to the guest even if the guest is not active in the system at a time that the interrupt message is received;

a peripheral device configured to initiate the interrupt;

an input/output memory management unit (IOMMU) configured to receive the interrupt from the peripheral device, wherein the IOMMU is configured to associate the interrupt with the guest responsive to data in one or more second data structures in the memory, and wherein the IOMMU is configured to transmit the interrupt message including a guest identifier that identifies the guest responsive to the interrupt being associated with the guest, and wherein the one or more second data structures also include a pointer to another memory location, wherein the guest interrupt manager is configured to locate the one or more first data structures in memory responsive to the pointer; and an interrupt controller that is assignable to the guest, wherein the guest interrupt manager is configured to forward the interrupt message to the interrupt controller to capture the interrupt in the interrupt controller in response to the first guest being in execution at a time that the interrupt message is received.

10. The system as recited in claim 9 wherein the interrupt controller is configured to store the guest identifier of the guest, and wherein the interrupt controller is configured to compare the guest identifier from a received interrupt message to the guest identifier stored in the interrupt controller, and wherein the interrupt controller is configured to accept the interrupt responsive to a match in the comparison of the guest identifiers.

11. The system as recited in claim 9 wherein the one or more first data structures comprise a plurality of entries, each entry configured to store at least a portion of a state of the interrupt controller for a given guest, and wherein the state in the entry includes a state of an interrupt request register, and wherein the guest interrupt manager is configured to update the state of the interrupt request register to record the interrupt.

12. The system as recited in claim 11 wherein the interrupt request register includes a bit corresponding to each interrupt vector supported by the interrupt controller, and wherein the interrupt message includes the interrupt vector of the interrupt, and wherein the guest interrupt manager is configured to update the bit corresponding to the interrupt vector from the interrupt message.

13. The system as recited in claim 12 wherein the update is atomic.

14. The system as recited in claim 13 wherein the update is an atomic OR.

15. A computer accessible storage medium storing a plurality of instructions which, when executed:
program an interrupt controller to accept an interrupt for a first guest;
read a data structure maintained by a guest interrupt manager to capture an interrupt state corresponding to the first guest subsequent to programming the interrupt controller, wherein the data structure comprises a plurality of entries, each entry configured to store at least a portion of a state of an interrupt controller for a given guest, and wherein the state includes a state of an interrupt request register; and
update a state of the interrupt controller with the interrupt state read from the data structure, wherein the interrupt controller includes the interrupt request register and the interrupt request register is updated with the state from the entry in the data structure that corresponds to the first guest.

16. The computer accessible storage medium as recited in claim 15 wherein the plurality of instructions which, when executed, update the state of the interrupt controller include instructions which, when executed, OR a set of interrupt request bits read from the data structure into an interrupt request register in the interrupt controller.

17. The computer accessible storage medium as recited in claim 15 wherein the plurality of instructions, when executed:
program the interrupt controller to stop accepting interrupts for the first guest;
read interrupt controller state from the interrupt controller; and
write the interrupt controller state to the data structure.

\* \* \* \* \*